US011836862B2

United States Patent
Zohar et al.

(10) Patent No.: US 11,836,862 B2
(45) Date of Patent: *Dec. 5, 2023

(54) EXTERNAL MESH WITH VERTEX ATTRIBUTES

(71) Applicant: Snap Inc., Santa Monica, CA (US)

(72) Inventors: Matan Zohar, Rishon LeZion (IL); Artem Bondich, Marina del Rey, CA (US); Yanli Zhao, London (GB); Brian Fulkerson, London (GB)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/498,394

(22) Filed: Oct. 11, 2021

(65) Prior Publication Data
US 2023/0115531 A1 Apr. 13, 2023

(51) Int. Cl.
*G06T 17/20* (2006.01)
*G06T 7/246* (2017.01)
(Continued)

(52) U.S. Cl.
CPC ............ *G06T 17/205* (2013.01); *G06T 7/251* (2017.01); *G06T 7/70* (2017.01); *G06T 19/006* (2013.01); *G06T 2207/10016* (2013.01)

(58) Field of Classification Search
CPC ...... G06T 17/205; G06T 19/006; G06T 19/20
See application file for complete search history.

(56) References Cited

U.S. PATENT DOCUMENTS 5,880,731 A    3/1999   Liles et al.
6,023,270 A    2/2000   Brush, II et al.
(Continued)

FOREIGN PATENT DOCUMENTS

CN    109863532 A    6/2019
CN    110168478 A    8/2019
(Continued)

OTHER PUBLICATIONS

English Translation of KR 101710521 B1, 2017 (Year: 2017).*
(Continued)

*Primary Examiner* — Charles Tseng
(74) *Attorney, Agent, or Firm* — Schwegman Lundberg & Woessner, P.A.

(57) ABSTRACT

Methods and systems are disclosed for performing operations for deforming an external mesh. The operations comprise receiving a video that includes a depiction of a real-world object. The operations comprise generating a three-dimensional (3D) body mesh associated with the real-world object that tracks movement of the real-world object across frames of the video. The operations comprise obtaining an external mesh associated with an Augmented-Reality (AR) element. The operations comprise accessing a plurality of deformation attributes associated with the external mesh, each attribute corresponding to a different deformation model. The operations comprise separately deforming, based on respective deformation models, a first portion of the external mesh and a second portion of the external mesh. The operations comprise modifying the video to include a display of the AR element based on the separately deformed first and second portions of the external mesh.

20 Claims, 11 Drawing Sheets

(51) Int. Cl.
*G06T 7/70* (2017.01)
*G06T 19/00* (2011.01)

(56) References Cited

U.S. PATENT DOCUMENTS

| | | |
|---|---|---|
| 6,223,165 B1 | 4/2001 | Lauffer |
| 6,268,846 B1 | 7/2001 | Georgiev |
| 6,772,195 B1 | 8/2004 | Hatlelid et al. |
| 6,842,779 B1 | 1/2005 | Nishizawa |
| 7,342,587 B2 | 3/2008 | Danzig et al. |
| 7,385,603 B2 | 6/2008 | Piponi |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | Andres del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,811,719 B2 | 8/2014 | Wilson et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,196,089 B2 | 11/2015 | Tena et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,465,833 B2 | 10/2016 | Aravamudan et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 11,663,792 B2 | 5/2023 | Zohar et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2005/0231510 A1 | 10/2005 | Santos |
| 2006/0170677 A1 | 8/2006 | Ong et al. |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0086783 A1 | 4/2012 | Sareen et al. |
| 2012/0092328 A1 | 4/2012 | Flaks et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2013/0286004 A1 | 10/2013 | Mcculloch et al. |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |

(56) References Cited

U.S. PATENT DOCUMENTS

| | | |
|---|---|---|
| 2015/0199563 A1 | 7/2015 | Hasegawa et al. |
| 2015/0206349 A1 | 7/2015 | Rosenthal et al. |
| 2016/0100034 A1 | 4/2016 | Miller |
| 2016/0134840 A1 | 5/2016 | Mcculloch |
| 2016/0234149 A1 | 8/2016 | Tsuda et al. |
| 2016/0342702 A1 | 11/2016 | Barve et al. |
| 2016/0378861 A1 | 12/2016 | Eledath et al. |
| 2017/0032055 A1 | 2/2017 | Eisemann et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0161948 A1 | 6/2017 | Hua et al. |
| 2017/0199855 A1 | 7/2017 | Fishbeck |
| 2017/0235848 A1 | 8/2017 | Van Deusen et al. |
| 2017/0285345 A1 | 10/2017 | Ferens et al. |
| 2017/0310934 A1 | 10/2017 | Du et al. |
| 2017/0312634 A1 | 11/2017 | Ledoux et al. |
| 2017/0372504 A1* | 12/2017 | Jang .................. G06Q 30/0643 |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0026942 A1 | 1/2019 | Zhang |
| 2019/0050427 A1 | 2/2019 | Wiesel et al. |
| 2019/0057616 A1 | 2/2019 | Cohen et al. |
| 2019/0188920 A1 | 6/2019 | Mcphee et al. |
| 2019/0228580 A1 | 7/2019 | Pelant et al. |
| 2019/0258058 A1* | 8/2019 | Fortin-Deschênes ... G06F 3/011 |
| 2020/0167995 A1 | 5/2020 | Hare et al. |
| 2020/0219320 A1 | 7/2020 | Moniri et al. |
| 2020/0250889 A1 | 8/2020 | Li |
| 2020/0312008 A1 | 10/2020 | Cowburn et al. |
| 2021/0006491 A1 | 3/2021 | Meier et al. |
| 2022/0185625 A1 | 6/2022 | One |
| 2022/0232162 A1 | 7/2022 | Gupta et al. |
| 2022/0270318 A1 | 8/2022 | Li et al. |
| 2022/0385721 A1 | 12/2022 | Kamaraju et al. |
| 2023/0061875 A1 | 3/2023 | Zhao et al. |
| 2023/0074826 A1 | 3/2023 | Zohar et al. |
| 2023/0080584 A1 | 3/2023 | Zohar et al. |
| 2023/0090645 A1 | 3/2023 | Zohar et al. |
| 2023/0111489 A1 | 4/2023 | Zohar et al. |
| 2023/0116929 A1 | 4/2023 | Zohar et al. |

FOREIGN PATENT DOCUMENTS

| | | | |
|---|---|---|---|
| EP | 2184092 A2 | 5/2010 | |
| JP | 2001230801 A | 8/2001 | |
| JP | 5497931 B2 | 3/2014 | |
| KR | 101445263 B1 | 9/2014 | |
| KR | 101710521 B1 * | 2/2017 | ........... G06T 19/006 |
| KR | 101710521 B1 | 2/2017 | |
| WO | WO-2003094072 A1 | 11/2003 | |
| WO | WO-2004095308 A1 | 11/2004 | |
| WO | WO-2006107182 A1 | 10/2006 | |
| WO | WO-2007134402 A1 | 11/2007 | |
| WO | WO-2012139276 A1 | 10/2012 | |
| WO | WO-2013027893 A1 | 2/2013 | |
| WO | WO-2013152454 A1 | 10/2013 | |
| WO | WO-2013166588 A1 | 11/2013 | |
| WO | WO-2014031899 A1 | 2/2014 | |
| WO | WO-2014194439 A1 | 12/2014 | |
| WO | WO-2016090605 A1 | 6/2016 | |
| WO | WO-2018081013 A1 | 5/2018 | |
| WO | WO-2018102562 A1 | 6/2018 | |
| WO | WO-2018129531 A1 | 7/2018 | |
| WO | WO-2019089613 A1 | 5/2019 | |
| WO | 2023039462 | 3/2023 | |
| WO | 2023043790 | 3/2023 | |
| WO | 2023044151 | 3/2023 | |
| WO | WO-2023034831 A1 | 3/2023 | |
| WO | WO-2023064244 A1 | 4/2023 | |
| WO | WO-2023064268 A1 | 4/2023 | |
| WO | WO-2023070021 A1 | 4/2023 | |

OTHER PUBLICATIONS

"U.S. Appl. No. 17/446,533, Notice of Allowance dated Feb. 6, 2023", 9 pgs.

"U.S. Appl. No. 17/447,614, Non Final Office Action dated Nov. 21, 2022", 18 pgs.

"U.S. Appl. No. 17/447,614, Notice of Allowance dated Mar. 1, 2023".

"U.S. Appl. No. 17/447,614, Response filed Feb. 20, 2023 to Non Final Office Action dated Nov. 21, 2022", 9 pgs.

"U.S. Appl. No. 17/468,774, Corrected Notice of Allowability dated Jan. 5, 2023", 2 pgs.

"U.S. Appl. No. 17/468,774, Non Final Office Action dated Aug. 19, 2022", 15 pgs.

"U.S. Appl. No. 17/468,774, Notice of Allowance dated Dec. 21, 2022", 10 pgs.

"U.S. Appl. No. 17/468,774, Response filed Nov. 21, 2022 to Non Final Office Action dated Aug. 19, 2022", 9 pgs.

"U.S. Appl. No. 17/498,510, Final Office Action dated Dec. 1, 2022", 17 pgs.

"U.S. Appl. No. 17/498,510, Non Final Office Action dated Aug. 19, 2022", 24 pgs.

"U.S. Appl. No. 17/498,510, Notice of Allowance dated Feb. 8, 2023", 9 pgs.

"U.S. Appl. No. 17/498,510, Response filed Jan. 25, 2023 to Final Office Action dated Dec. 1, 2022", 10 pgs.

"U.S. Appl. No. 17/498,510, Response filed Nov. 17, 2022 to Non Final Office Action dated Aug. 19, 2022", 12 pgs.

"U.S. Appl. No. 17/506,442, Non Final Office Action dated Dec. 16, 2022", 22 pgs.

"U.S. Appl. No. 17/506,442, Response filed Mar. 2, 2023 to Non Final Office Action dated Dec. 16, 2022", 8 pgs.

"Face Morph", Anonymous: XP093007820, (Dec. 8, 2020), 10 pgs.

"International Application Serial No. PCT/US2022/043456, International Search Report dated Jan. 10, 2023", 4 pgs.

"International Application Serial No. PCT/US2022/043456, Written Opinion dated Jan. 10, 2023", 6 pgs.

"International Application Serial No. PCT/US2022/044113, International Search Report dated Feb. 28, 2023", 4 pgs.

"International Application Serial No. PCT/US2022/044113, Written Opinion dated Feb. 28, 2023", 5 pgs.

"International Application Serial No. PCT/US2022/046273, International Search Report dated Jan. 4, 2023", 4 pgs.

"International Application Serial No. PCT/US2022/046273, Written Opinion dated Jan. 4, 2023", 6 pgs.

"International Application Serial No. PCT/US2022/075706, International Search Report dated Feb. 10, 2023", 7 pgs.

"International Application Serial No. PCT/US2022/075706, Invitation to Pay Additional Fees dated Dec. 19, 2022", 17 pgs.

"International Application Serial No. PCT/US2022/075706, Written Opinion dated Feb. 10, 2023", 16 pgs.

"International Application Serial No. PCT/US2022/076095, International Search Report dated Jan. 10, 2023", 4 pgs.

"International Application Serial No. PCT/US2022/076095, Written Opinion dated Jan. 10, 2023", 8 pgs.

"International Application Serial No. PCT/US2022/078413, International Search Report dated Jan. 10, 2023", 5 pgs.

"International Application Serial No. PCT/US2022/078413, Written Opinion dated Jan. 10, 2023", 6 pgs.

"Lens Studio 4 Full Body 3D Mesh—Miraculous Ladybug Suit", 2mnts: XP093008137, (Jun. 13, 2021), 1 pg.

"Lens Studio Face Morph Template", Snap Ar: XP093007784, (Dec. 8, 2020), 2 pgs.

"Physics engine", Anonymous: XP093008130, (Jun. 26, 2021), 6 pgs.

"Werewolf Snapchat Filter W MrAlanC", MrAlanC XP093008184, (Oct. 30, 2017), 2 pgs.

(56) References Cited

OTHER PUBLICATIONS

Brouet, Remi, et al., "Design preserving garment transfer", ACM Transactions on Graphics, vol. 31, No. 4, (Jul. 1, 2012), 11 pgs.

Gao, et al., "Visual Reference of Ambiguous Objects for Augmented Reality-Powered Human-Robot Communication in a Shared Workspace", HCII 2020, LNCS 12190, (Jul. 2020), 550-561.

Irawati, et al., "Move the Couch Where?: Developing an Augmented Reality Multimodal Interface", IEEE/ACM International Symposium on Mixed and Augmented Reality, (2006), 183-186.

Kanazawa, Angjoo, et al., "End-to-End Recovery of Human Shape and Pose", 2018 IEEE/CVF Conference on Computer Vision and Pattern Recognition (CVPR) IEEE Computer Society, (Jun. 1, 2018), 10 pgs.

Lam, Meng Chun, et al., "A combination of static and stroke gesture with speech for multimodal interaction in a virtual environment", 2015 International Conference on Electrical Engineering and Informatics (ICEEI), IEEE, (Aug. 10, 2015), 59-64.

Lee, Bokyung, et al., "Posing and Acting as Input for Personalizing Furniture", Human-Computer Interaction, Acm, 2 Penn Plaza, Suite 701 New York Ny 10121-0701 USA, (Oct. 23, 2016), 1-10 Pgs.

Lee, Minkyung, et al., "A usability study of multimodal input in an augmented reality environment", Virtual Reality, vol. 17, No. 4,, [Online]. Retrieved from the Internet: <URL:https://link.springer.com/content/pdf/10.1007/s10055-013-0230-0.pdf?pdf=button>, (Sep. 21, 2013), 293-305.

Liu, Yejun, et al., "Magic Mirror A Virtual Fashion Consultant", 2017 ACM Conference on Information and Knowledge Management, CIKM '17, ACM Press, New York, NY, USA, (Oct. 1, 2016), 680-683.

Makarov, Ilya, et al., "Real-Time 3D Model Reconstruction and Mapping for Fashion", 2020 43rd International Conference on Telecommunications and Signal Processing (TSP), IEEE, (Jul. 7, 2020), 133-138.

Saakes, Daniel, et al., "Mirror Mirror: an On-Body T-shirt Design System", CHI 2016, ACM, Penn Plaza, Suite 701 New York NY 10121-0701 USA, (May 7, 2016), 6058-6063.

Sekhavat, "Privacy Preserving Cloth Try-On Using Mobile Augmented Reality", IEEE, (May 2017), 1041-1049.

SR212787, "FB Messenger Wolf", [Online] Retrieved from the Internet: <URL: https://www.youtube.com/watch?v=2s-RG7BDX2Q>, (2018), 3 pgs.

Straka, Matthias, "Human Pose and Shape Estimation from Multi-View Images for Virtual Dressing Rooms", [Online]. Retrieved from the Internet: <URL: https://diglib.tugraz.at/download.php?id=576a7d2822561&location=browse>, (Jan. 1, 2014), 155 pgs.

Sun, Zehua, et al., "Human Action Recognition from Various Data Modalities: A Review", arXiv:2012.11866v4 [cs,CV], Cornell University Library, 201 Olin Library Cornell University Ithaca, NY 14853, (Jul. 23, 2021), 20 pgs.

Tak, "Apparatus and Method of Performing Simulation for Virtual Fittingwith Computer-Graphics Representation of User Body andcomputer Program for the Same", (2017), 1-9.

Wuhrer, Stefanie, et al., "Estimation of human body shape and posture under clothing", Computer Vision and Image Understanding, Academic Press, US, vol. 127, (Jul. 1, 2014), 31-42.

"International Application Serial No. PCT/US2022/046234, International Search Report dated Mar. 3, 2023", 4 pgs.

"International Application Serial No. PCT/US2022/046234, Written Opinion dated Mar. 3, 2023", 9 pgs.

"Chain Physics", Snap AR, [Online]. Retrieved from the Internet: https://www.youtube.com/watch?v=IL-DDxjmHIU, (Dec. 12, 2019), 2 pgs.

Oikonomou, Konstantinos, "Snapwear: A Snapchat AR fitter for the virtual tryon of real clothes", 2021 IEEE International Symposium on Mixed and Augmented Reality Adjunct (ISMAR-Adjunct), IEEE, (Oct. 4, 2021), 6 pgs.

"U.S. Appl. No. 17/446,533, Notice of Allowance dated Jun. 14, 2023", 8 pgs.

"U.S. Appl. No. 17/447,614, Notice of Allowance dated Jun. 28, 2023", 5 pgs.

"Application Serial No. 17/448, 158, Corrected Notice of Allowability dated Apr. 24, 2023", 2 pgs.

"U.S. Appl. No. 17/448, 158, Notice of Allowance dated Apr. 12, 2023", 10 pgs.

"U.S. Appl. No. 17/468,774, Notice of Allowance dated Apr. 13, 2023", 9 pgs.

"U.S. Appl. No. 17/498,510, Notice of Allowance dated Jun. 12, 2023", 5 pgs.

"U.S. Appl. No. 17/506,442, Notice of Allowance dated May 10, 2023", 7 pgs.

Habermann, Marc, "Real-Time Deep Dynamic Characters", ACM Trans. Graph., vol. 40, Iss. 4, Art. 94, (2021), 16 pgs.

Wang, Charles, "CAD Tools in Fashion/Garment Design", Computer Aided Design Applications, vol. 1, (2004), 53-62.

"U.S. Appl. No. 17/447,614, Corrected Notice of Allowability dated Jul. 20, 2023", 2 pgs.

"U.S. Appl. No. 17/448,158, Notice of Allowance dated Jul. 26, 2023", 9 pgs.

* cited by examiner

EXTERNAL MESH WITH VERTEX ATTRIBUTES

TECHNICAL FIELD

The present disclosure relates generally to providing augmented reality (AR) experiences using a messaging application.

BACKGROUND

Augmented-Reality (AR) is a modification of a virtual environment. For example, in Virtual Reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
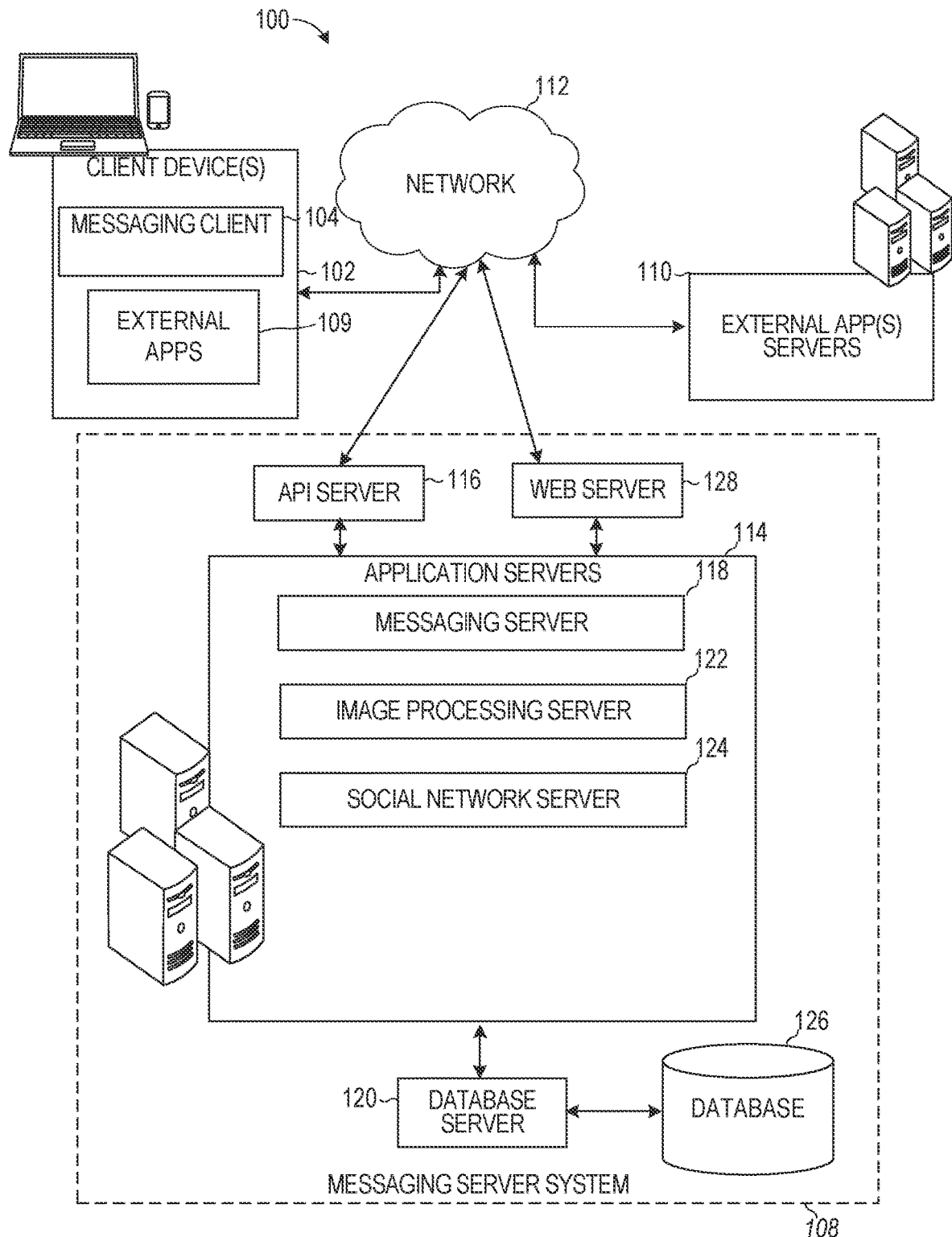
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typically, VR and AR systems display images representing a given user by capturing an image of the user and, in addition, obtaining a depth map using a depth sensor of the real-world human body depicted in the image. By processing the depth map and the image together, the VR and AR systems can detect positioning of a user in the image and can appropriately modify the user or background in the images. While such systems work well, the need for a depth sensor limits the scope of their applications. This is because adding depth sensors to user devices for the purpose of modifying images increases the overall cost and complexity of the devices, making them less attractive.

Certain systems do away with the need to use depth sensors to modify images. For example, certain systems allow users to replace a background in a videoconference in which a face of the user is detected. Specifically, such systems can use specialized techniques that are optimized for recognizing a face of a user to identify the background in the images that depict the user's face. These systems can then replace only those pixels that depict the background so that the real-world background is replaced with an alternate background in the images. However, such systems are generally incapable of recognizing a whole body of a user. As such, if the user is more than a threshold distance from the camera such that more than just the face of the user is captured by the camera, the replacement of the background with an alternate background begins to fail. In such cases, the image quality is severely impacted, and portions of the face and body of the user can be inadvertently removed by the system as the system falsely identifies such portions as belonging to the background rather than the foreground of the images. Also, such systems fail to properly replace the background when more than one user is depicted in the image or video feed. Because such systems are generally incapable of distinguishing a whole body of a user in an image from a background, these systems are also unable to apply visual effects to certain portions of a user's body, such as articles of clothing or fashion accessories (e.g., jewelry, handbags, purses, and so forth).

Some AR systems allow AR graphics to be added to an image or video to provide engaging AR experiences. Such systems can receive the AR graphics from a designer and can scale and position the AR graphics within the image or video. In order to improve the placement and positioning of the AR graphics on a person depicted in the image or video, such systems detect a person depicted in the image or video and generate a rig representing bones of the person. This rig is then used to adjust the AR graphics based on changes in movement to the rig. While such approaches generally work well, the need for generating a rig of a person in real time to adjust AR graphics placement increases processing complexities and power and memory requirements. This makes such systems inefficient or incapable of running on small scale mobile devices without sacrificing computing resources or processing speed. Also, the rig only represents movement of skeletal or bone structures of a person in the image or video and does not take into account any sort of external physical properties of the person, such as density, weight, skin attributes, and so forth. As such, any AR graphics in these systems can be adjusted in scale and positioning but cannot be deformed based on other physical properties of the person. In addition, an AR graphics designer typically needs to create a compatible rig for their AR graphic or AR fashion item.

The disclosed techniques improve the efficiency of using the electronic device by generating a body mesh of an object, such as a person, depicted in the image and deforming an external mesh in correspondence with the body mesh. By deforming an external mesh based on changes to the body mesh of a depicted object, the disclosed techniques can apply one or more visual effects to the image or video in association with the person depicted in the image or video in a more efficient manner and without the need for generating a rig or bone structures of the depicted object. Particularly, the disclosed techniques can apply one or more AR elements to a person or object depicted in the image or video and then modify the one or more AR elements based on movement of the object as determined by changes to the body mesh of the object.

The disclosed techniques can also deform or modify different portions of the AR elements separately based on different criteria or attributes associated with such portions. For example, a first portion of the AR element that is attached or overlaps the depicted object (e.g., a strap of a purse) can be deformed or modified based on changes to the three-dimensional (3D) body mesh of the object. A second portion of the AR element can extend beyond and dangle away from the depicted object and/or the first portion of the AR element and can be deformed (together with, simultaneously with, and/or separate from) the first portion based on information associated with an external force model (e.g., a physics simulation model, a collision simulation model, chain physics, a cloth simulation model, gravity displacement, and so forth). In an example, the disclosed techniques can access attribute information for each portion of the AR element. Based on the attribute information, the disclosed techniques can select a deformation model that is used to deform the respective portion of the AR element. In this way, different portions of the AR element can be deformed separately and using different deformation models based on the attributes specified for such portions. In an example, the attributes information can include any combination of garment location metric, a garment looseness metric, a body mesh density threshold, or a distance threshold. The deformation models can include any combination of an external force model and/or a real-world body movement model.

This simplifies the process of adding AR graphics to an image or video which significantly reduces design constraints and costs in generating such AR graphics and decreases the amount of processing complexities and power and memory requirements. This also improves the illusion of the AR graphics being part of a real-world environment depicted in an image or video that depicts the object. This enables seamless and efficient addition of AR graphics to an underlying image or video in real time on small scale mobile devices. The disclosed techniques can be applied exclusively or mostly on a mobile device without the need for the mobile device to send images/videos to a server. In other examples, the disclosed techniques are applied exclusively or mostly on a remote server or can be divided between a mobile device and a server.

Also, the disclosed techniques allow an AR graphics designer to generate an external mesh for their AR graphics without creating a compatible rig for the AR graphics which saves time, effort, and creation complexity. The disclosed techniques enable the AR graphics (AR fashion items) to be deformed with the user's shape (weight, height, body shape, and so forth) by creating a correspondence between a body mesh and an external mesh of an AR graphic or AR fashion item. The disclosed techniques also enable a designer to specify attributes of the AR fashion item to cause certain portions of the AR graphics (by way of deforming the associated external mesh) to be modified or deformed based on an external force model rather than based on the body mesh and/or in combination with body mesh movement information. For example, the designer can specify that a portion of an AR dress that is more than a certain threshold distance away from a torso of a body be deformed based on an external force model and a second portion of the dress that is within the certain threshold distance be deformed in accordance with movement of the 3D body mesh portion over which the second portion is placed. In an implementation, the external force model can leverage information associated with movement of the body mesh model to compute modifications and deformations to the portion of the external mesh (and associated AR graphics) that is associated with the external force model.

As a result, a realistic display can be provided that shows the user wearing an AR fashion item while deforming the AR fashion item based on three-dimensional (3D) movement of the user, including changes to the body shape, body state, body properties, position, and rotation, in a way that is intuitive for the user to interact with and select. As used herein, "article of clothing," "fashion item," and "garment" are used interchangeably and should be understood to have the same meaning. This improves the overall experience of the user in using the electronic device. Also, by providing such AR experiences without using a depth sensor, the overall amount of system resources needed to accomplish a task is reduced.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications, such as external apps 109 using Application Programming Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an API server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114 and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration; login functionality; the sending of messages, via the application servers 114, from a particular messaging client 104 to another messaging client 104; the sending of media files (e.g., images or video) from a messaging client 104 to a messaging server 118, and for possible access by another messaging client 104; the settings of a collection of media data (e.g., story); the retrieval of a list of friends of a user of a client device 102; the retrieval of such collections; the retrieval of messages and content; the addition and deletion of entities (e.g., friends) to an entity graph (e.g., a social graph); the location of friends within a social graph; and opening an application event (e.g., relating to the messaging client 104).

The application servers 114 host a number of server applications and subsystems, including, for example, a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 2:
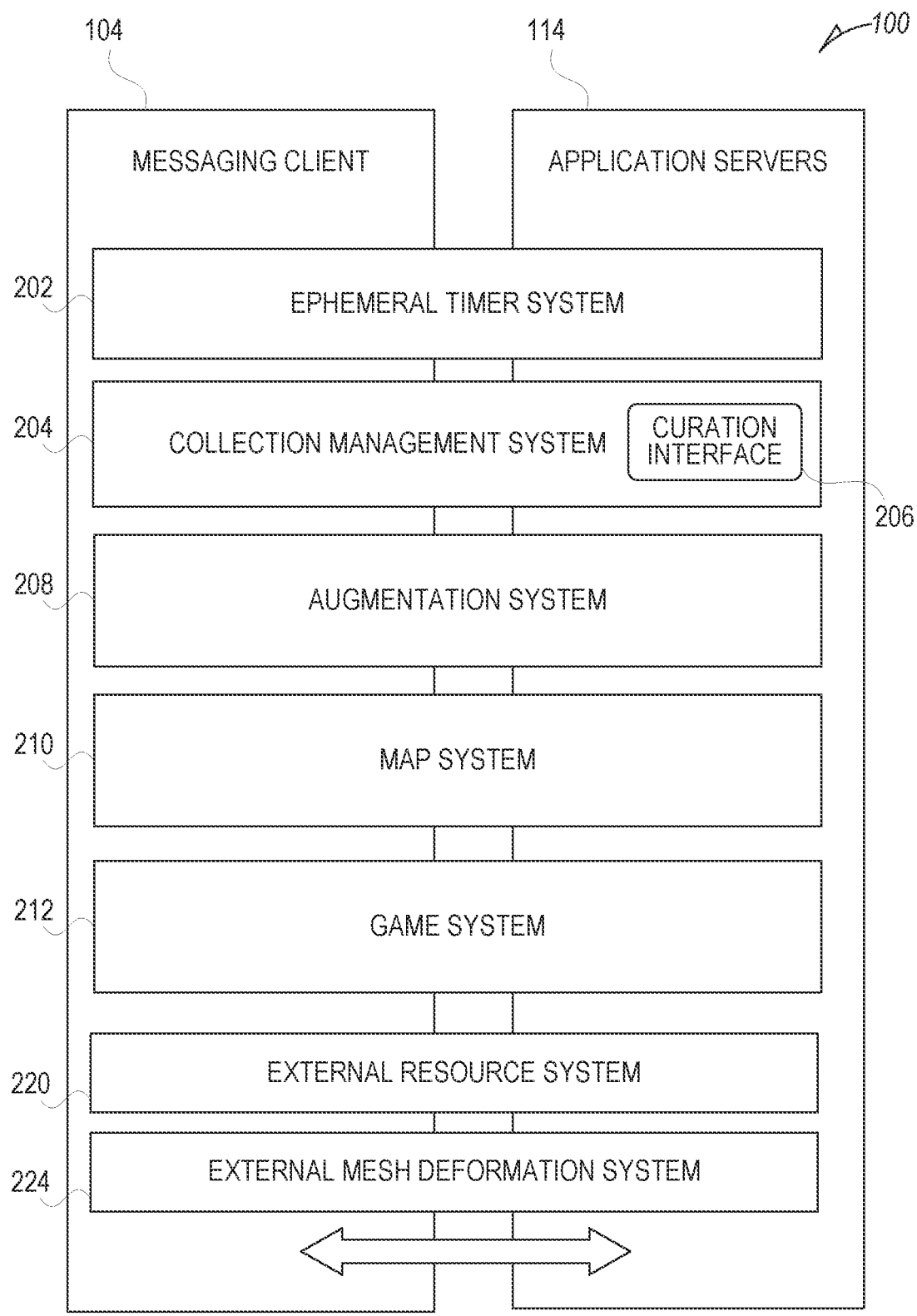
FIG. 2 is a diagrammatic representation of a messaging client application, in accordance with some examples.

Image processing server 122 is used to implement scan functionality of the augmentation system 208 (shown in FIG. 2). Scan functionality includes activating and providing one or more AR experiences on a client device 102 when an image is captured by the client device 102. Specifically, the messaging client 104 on the client device 102 can be used to activate a camera. The camera displays one or more real-time images or a video to a user along with one or more icons or identifiers of one or more AR experiences. The user can select a given one of the identifiers to launch the corresponding AR experience or perform a desired image modification (e.g., replacing a garment being worn by a user in a video or recoloring the garment worn by the user in the video or modifying the garment based on a gesture performed by the user).

Figure 3:
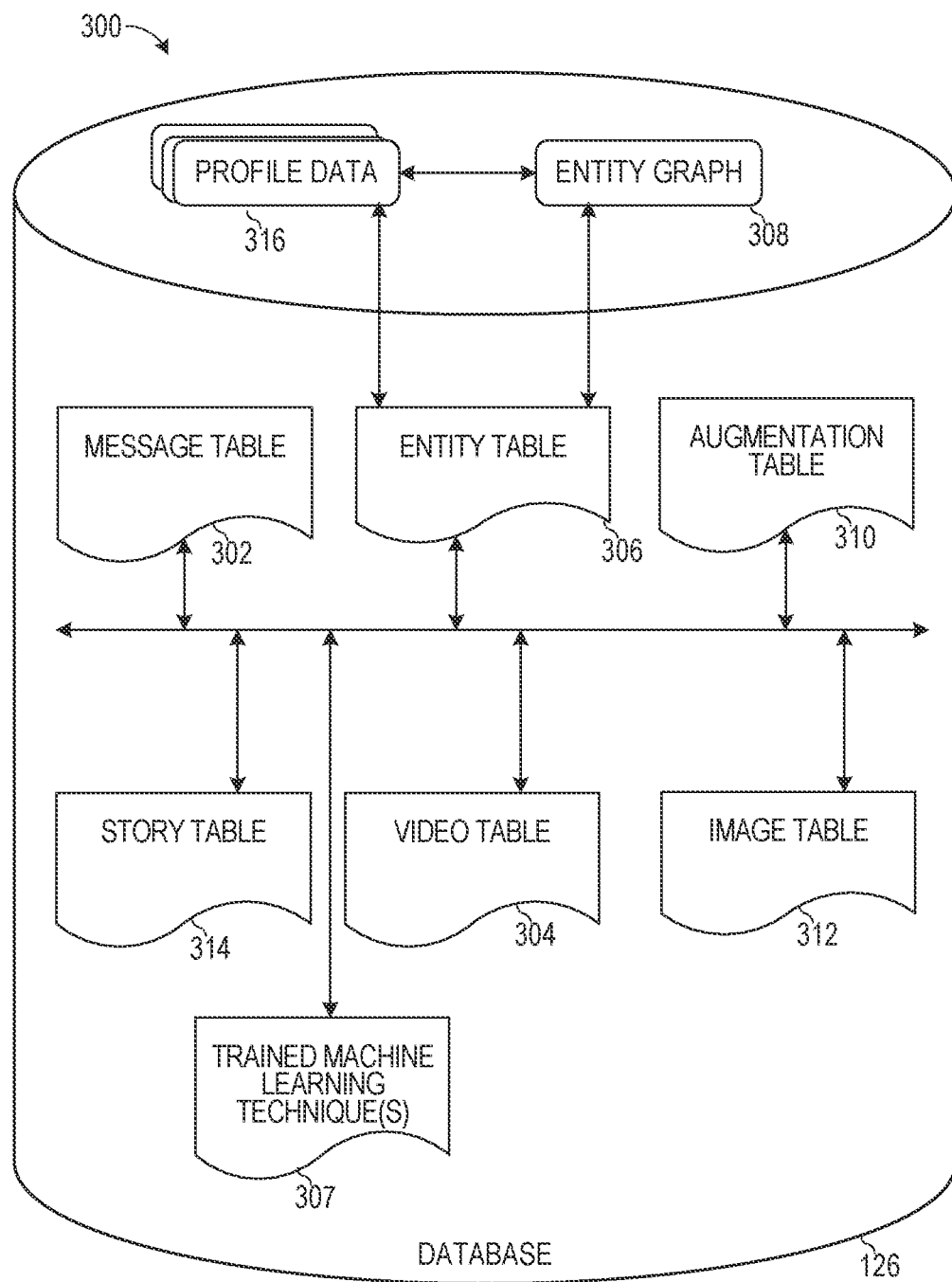
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following" and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s)

server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

The messaging client 104 can present, to a user, one or more AR experiences. As an example, the messaging client 104 can detect a person in an image or video captured by the client device 102. The messaging client 104 can generate a body mesh for the person depicted in the image or video. The body mesh can be a 3D mesh, or polygon mesh, that includes a collection of vertices, edges, and faces that define the shape of a polyhedral object depicted in the image or video. The mesh can be a collection of several closed surfaces. In a mathematical vector algebraic sense, which may be important for calculations, a mesh can be a collection of numbers organized into several matrices. In a geometric description, a mesh can be made of points that are joined together with segments and surfaced by polygons.

The messaging client 104 can receive a user selection of an AR graphic to add to the image or video. The messaging client 104 can obtain an external mesh associated with the AR graphic. The AR graphic can represent a fashion accessory or other item that has a first portion attached to a depicted object, such as a person, and a second portion that hangs freely or dangles from the first portion of the depicted object or in which the entire fashion item dangles freely from the depicted real-world object. For example, the AR graphic can represent earrings which are attached to a person's ears or other body part and have a portion that dangles freely in the air. For example, the AR graphic can represent a belt which wraps around a waist of a person's body or other body part and has a portion that dangles freely in the air. For example, the AR graphic can represent a hair tie which wraps around hair of a person's body or other body part and has a portion that dangles freely in the air. For example, the AR graphic can represent a fantasy item or object that is attached to a person's body or other body part (such as an AR tail, extra limbs, extra head, long fur, and so forth) and has a portion that dangles freely in the air. The AR graphic can represent bunny ears that are attached to the person at one end and dangle freely at another end. The AR graphic can represent a purse or handbag which has a strap that overlaps or is attached to a body of a person depicted in the image or video and that has a container portion (the purse) that dangles freely from the strap. The AR graphic can represent a shirt or other garment that has a first looseness metric indicating how tight or loose the garment is when worn by a depicted person. The AR graphic can represent a shirt or other garment that has a second looseness metric that is greater (indicating more loose) or less than (indicating tighter) than the first looseness metric. The AR graphic can represent a dress that has a first portion close to the torso of the person depicted in the image having a first looseness metric (e.g., being tight on the person) and a second portion close to the legs and away from the torso by more than a threshold having a second looseness metric (e.g., being loose around the legs).

The external mesh associated with the AR graphic can include different portions that are deformed separately based on whether the portions are attached or associated with the object depicted in the image or video or dangle freely from the object depicted in the image or video. The different portions can be associated with different deformation attributes that can be specified by a designer of the AR graphic. Each different deformation attribute defines the deformation model used to deform the corresponding portion of the AR graphic. As an example, the plurality of deformation attributes can correspond to at least one of a garment location metric, a garment looseness metric, a body mesh density threshold, or a distance threshold, and the deformation model can include an external force model or a real-world body movement model (e.g., body movement model).

The messaging client 104 can automatically establish a correspondence between the body mesh (e.g., 3D body mesh) and the external mesh. The messaging client 104 can position the external mesh over or with respect to the 3D body mesh within the image or video. The messaging client 104 can determine (based on placement information associated with the external mesh) a first portion or first set of portions that are deformed based on movement information associated with the 3D body mesh, such as based on a first deformation attribute associated with the first portion or first set of portions. The messaging client 104 can determine (based on placement information associated with the external mesh) a second portion or second set of portions that are deformed based on an external force simulation separately from deforming the first portion or first set of portions based on the movement information associated with the 3D body mesh, such as based on a second deformation attribute associated with the second portion or second set of portions.

The messaging client 104 can then display the AR graphic (which has been deformed based on the deformation attributes of the external mesh) within the image or video. This provides the user with a realistic display of the image or video depiction of the person combined with the selected AR graphic that has different portions moving in different ways (either based on movement of the person or application of an external force, such as gravity, cloth simulation, or collision). In an example, the AR graphic can be a fashion item, such as a shirt, pants, skirt, dress, jewelry, purse, furniture item, household item, eyewear, eyeglasses, AR logos, AR emblems, or any other suitable item or object. While the disclosed examples are discussed in relation to an AR dress (or user of the client device 102) that is added to an image or video, similar techniques can be applied to any other AR items or article of clothing or fashion item, such as a purse, pants, shorts, skirts, jackets, t-shirts, blouses, glasses, jewelry, earrings, bunny ears, a hat, ear muffs, and so forth.

In this way, the messaging client 104 can adjust an external mesh (and as a result the AR graphic associated with the external mesh) in real time based on movements and other changes (e.g., changes to the body shape, position, rotation and scale) of a body mesh associated with an object, such as a person, depicted in the image or video and based on application of external forces. This provides an illusion that the AR graphic is actually included in the real-world environment depicted in the image or video which improves the overall user experience. Further details of the deformation of the external mesh with respect to the body mesh and external forces are provided below in connection with FIG. 5.

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 further includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or an image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain AR experiences and presents identifiers of such experiences in one or more user interfaces (e.g., as icons over a real-time image or video or as thumbnails or icons in interfaces dedicated for presented identifiers of AR experiences). Once an AR experience is selected, one or more images, videos, or AR graphical elements are retrieved and presented as an overlay on top of the images or video captured by the client device 102. In some cases, the camera is switched to a front-facing view (e.g., the front-facing camera of the client device 102 is activated in response to activation of a particular AR experience) and the images from the front-facing camera of the client device 102 start being displayed on the client device 102 instead of the rear-facing camera of the client device 102. The one or more images, videos, or AR graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 112. The data exchanged can include a session identifier that identifies the shared AR session, a transformation between a first client device 102 and a second client device 102 (e.g., a plurality of client devices 102 include the first and second devices) that is used to align the shared AR session to a common point of origin, a common coordinate frame, functions (e.g., commands to invoke functions), and other payload data (e.g., text, audio, video or other multimedia data).

The augmentation system 208 sends the transformation to the second client device 102 so that the second client device 102 can adjust the AR coordinate system based on the transformation. In this way, the first and second client devices 102 synch up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging) for the client devices 102 in a shared AR session. The electronic group communication session can be associated with a session identifier provided by the client devices 102 to gain access to the electronic group communication session and to the shared AR session. In one example, the client devices 102 first gain access to the electronic group communication session and then obtain the session identifier in the electronic group communication session that allows the client devices 102 to access the shared AR session. In some examples, the client devices 102 are able to access the shared AR session without aid or communication with the augmentation system 208 in the application servers 114.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104 and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes APIs with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets) and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional (2D) avatars of users with or without different avatar characteristics). As another example, external resources that include small-scale versions of external applications (e.g., web-based versions of third-party applications) are provided with access to a second type of user data (e.g., payment information, 2D avatars of users, 3D avatars of users, and avatars with various avatar characteristics). Avatar characteristics include different ways to customize a look and feel of an avatar, such as different poses, facial features, clothing, and so forth.

An external mesh deformation system 224 deforms an external mesh based on changes to a 3D/2D body mesh of an object depicted in an image or video in real time and based on an external force simulation model (external force model). In an example, the external mesh deformation system 224 deforms a first portion of the external mesh that is associated with a first deformation attribute based on a first deformation model, such as based on movement information associated with the body mesh. The external mesh deformation system 224 deforms a second portion of the external mesh that is associated with a second deformation attribute based on a second deformation model, such as based on an external force simulation model. In an example, in response to deforming different portions of the external mesh based on different deformation models, the external mesh deformation system 224 can present an AR graphic associated with the external mesh in the image or video, such as by presenting a fashion item fitted to a user depicted in an image (or video) or multiple AR fashion items on top of multiple users depicted in an image (or video) where different portions of the AR fashion item or graphic move in different ways (some dependent on the movement of the real-world object and others based on an external force model, such as collision or cloth simulation or gravity). In some examples, the external mesh deformation system 224 can add additional visual effects to the AR graphic, such as particles or sparkles, that move based on the external force simulation model in similar ways as the AR graphic is moved. An illustrative implementation of the external mesh deformation system 224 is shown and described in connection with FIG. 5 below.

Specifically, the external mesh deformation system 224 is a component that can be accessed by an AR/VR application implemented on the client device 102. The AR/VR application uses an RGB camera to capture a monocular image of a user. The AR/VR application applies various trained machine learning techniques on the captured image of the user to generate a 3D body mesh representing the user depicted in the image and to apply one or more AR visual effects to the captured image by deforming one or more external meshes associated with the AR visual effects. In some implementations, the AR/VR application continuously captures images of the user and updates the 3D body mesh and external mesh(es) in real time or periodically to continuously or periodically update the applied one or more visual effects. This allows the user to move around in the real world and see the one or more visual effects update in real time. In some examples, the external mesh deformation system 224 automatically establishes a correspondence between the external mesh and the 3D body mesh once prior to runtime (e.g., before the AR graphics are presented to the user), and then the external mesh and the 3D body mesh are deformed with respect to each other during runtime to update the display of the AR graphics associated with the external mesh. In other examples, the automated correspondence can continuously be updated and generated during runtime while also deforming the external mesh.

In training, the external mesh deformation system 224 obtains a first plurality of input training images that include depictions of one or more users having different body types and characteristics. These training images also provide the ground truth information including body meshes corresponding to the one or more users depicted in each image. A machine learning technique (e.g., a deep neural network)

is trained based on features of the plurality of training images. Specifically, the machine learning technique extracts one or more features from a given training image and estimates a 3D body mesh for the user depicted in the given training image. The machine learning technique obtains the ground truth information including the 3D body mesh corresponding to the training image and adjusts or updates one or more coefficients or parameters to improve subsequent estimations of body meshes.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, are described below with reference to FIG. 4.

An entity table 306 stores entity data and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization), interest-based, or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, and settings (e.g., notification and privacy settings), as well as a user-selected avatar representation (or collection of such avatar representations). A particular user may then selectively include one or more of these avatar representations within the content of messages communicated via the messaging system 100 and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes AR content items (e.g., corresponding to applying AR experiences). An AR content item or AR item may be a real-time special effect and sound that may be added to an image or a video.

As described above, augmentation data includes AR content items, overlays, image transformations, AR images, AR logos or emblems, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple AR content items, a user can use a single video clip with multiple AR content items to see how the different AR content items will modify the stored clip. For example, multiple AR content items that apply different pseudorandom movement models can be applied to the same content by selecting different AR content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different AR content items will look within different windows in a display at the same time. This can, for example, enable multiple windows with different pseudorandom animations to be viewed on a display at the same time.

Data and various systems using AR content items or other such transform systems to modify content using this data can thus involve detection of real-world objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a 3D mesh model of the object or objects and using transformations and animated textures of the model within the video to achieve the transformation. In other examples, tracking of points on an object may be used to place an image or texture (which may be 2D or 3D) at the tracked position. In still further examples, neural network analysis of video frames may be used to place images, models, or textures in content (e.g., images or frames of video). AR content items or elements thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples, two meshes associated with different objects can be generated and deformed in correspondence to each other. A first mesh (also referred to as the body mesh or 3D body mesh) can be associated with and represent movements of a real-world object, such as a person, depicted in the image or video. A second mesh (also referred to as an external mesh) can be associated with an AR graphic or effect to be applied to the real-world object. The second mesh can be associated with placement information that specifies how the second mesh is placed or positioned in 3D space relative to the first mesh. The placement information can capture automatically generated correspondence information based on proximity (controlled by minimum or maximum distance thresholds or number of controlling vertices) between one or more vertices of the first mesh and one or more vertices of the second mesh. The placement information can also be specified in terms of UV space information that indicates how close or how far to place the second mesh in the UV space relative to UV coordinates of the first mesh. The placement information can also specify deformation attributes, such as indicating a first set of portions to deform based on a first deformation model (e.g., based on movement of the corresponding first mesh) and a second set of portions to deform based on a second deformation model (e.g., an external force simulation model). The deformation attributes can be used to select the different portions of the second mesh and to control how the selected portions are moved relative to the first mesh. As the first mesh is deformed in real time during capture of the image or video, the first and second sets of portions of the second mesh are similarly deformed (based on changes to the first mesh and/or outputs of the external force simulation model) to effectuate a change to the corresponding AR graphic that is rendered for display in the image or video.

In some examples of a computer animation model to transform image data using body/person detection, the body/person is detected on an image with use of a specific body/person detection algorithm (e.g., 3D human pose estimation and mesh reconstruction processes). Then, an ASM algorithm is applied to the body/person region of an image to detect body/person feature reference points.

Other methods and algorithms suitable for body/person detection can be used. For example, in some examples, features are located using a landmark, which represents a distinguishable point present in most of the images under consideration. For body/person landmarks, for example, the location of the left arm may be used. If an initial landmark is not identifiable, secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the body/person determined by a global body/person detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, 3D human pose estimation, 3D body mesh reconstruction, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a body/person within the image or video stream and provides modification icons associated with a computer animation model to transform image data, or the computer animation model can be present as associated with an interface described herein. The modification icons include changes that may be the basis for modifying the user's body/person within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the body/person being modified by the transformation system and store it for later viewing or browse to other areas of the imaging application. Where multiple faces are modified by the transformation system, the user may toggle the modification on or off globally by tapping or selecting a single body/person modified and displayed within a graphical user interface. In some examples, individual bodies/persons, among a group of multiple bodies/persons, may be individually modified, or such modifications may be individually toggled by tapping or selecting the individual body/person or a series of individual bodies/persons displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Trained machine learning technique(s) 307 stores parameters that have been trained during training of the external mesh deformation system 224. For example, trained machine learning techniques 307 stores the trained parameters of one or more neural network machine learning techniques.

Data Communications Architecture

Figure 4:
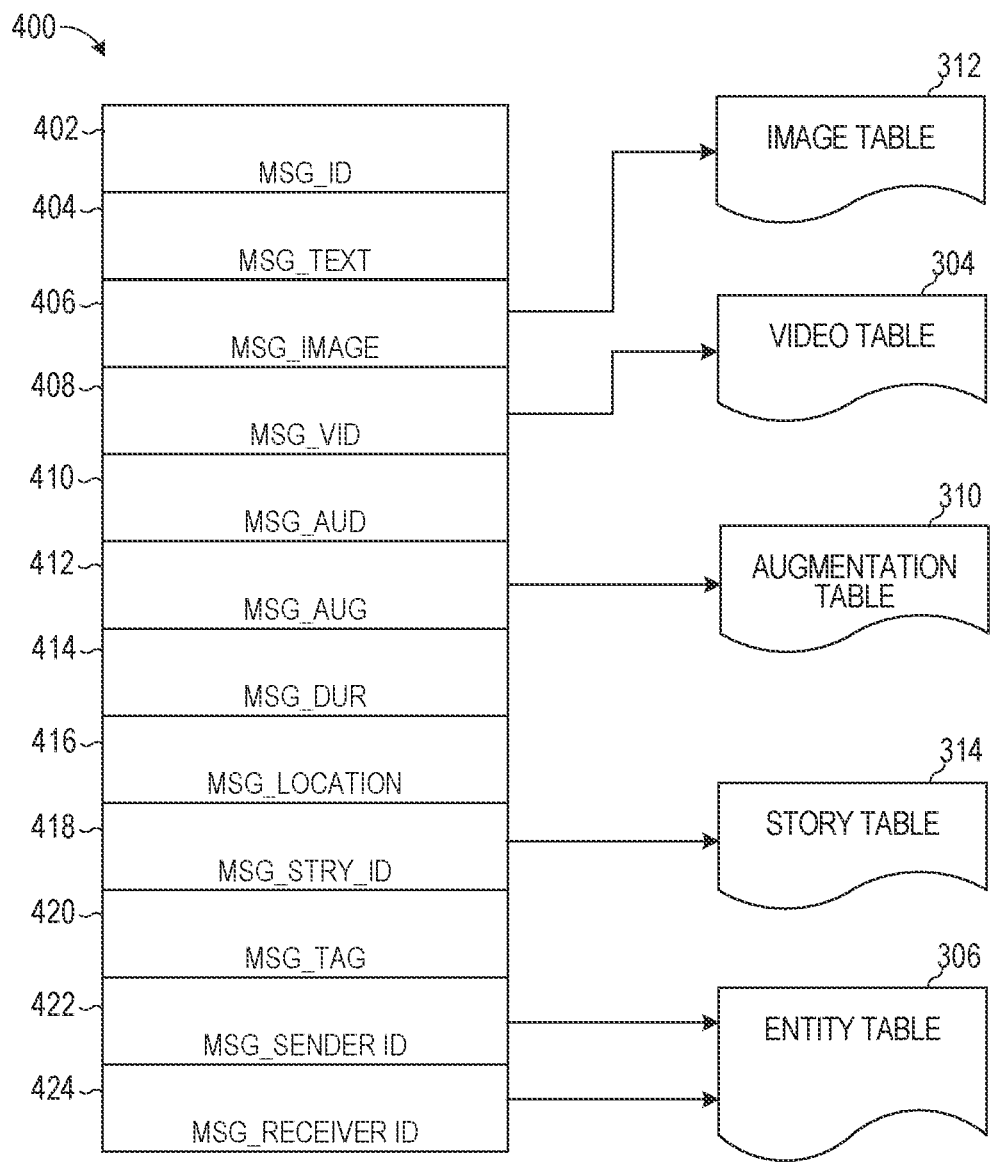
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

> message identifier 402: a unique identifier that identifies the message 400.
> 
> message text payload 404: text, to be generated by a user via a user interface of the client device 102, and that is included in the message 400.
> 
> message image payload 406: image data, captured by a camera component of a client device 102 or retrieved from a memory component of a client device 102, and that is included in the message 400. Image data for a sent or received message 400 may be stored in the image table 312.
> 
> message video payload 408: video data, captured by a camera component or retrieved from a memory component of the client device 102, and that is included in the message 400. Video data for a sent or received message 400 may be stored in the video table 304.
> 
> message audio payload 410: audio data, captured by a microphone or retrieved from a memory component of the client device 102, and that is included in the message 400.
> 
> message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
> 
> message duration parameter 414: parameter value indicating, in seconds, the amount of time for which content of the message (e.g., the message image payload 406, message video payload 408, message audio payload 410) is to be presented or made accessible to a user via the messaging client 104.
> 
> message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
> 
> message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
> 
> message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
> 
> message sender identifier 422: an identifier (e.g., a messaging system identifier, email address, or device identifier) indicative of a user of the client device 102 on which the message 400 was generated and from which the message 400 was sent.
> 
> message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

External Mesh Deformation System

Figure 5:
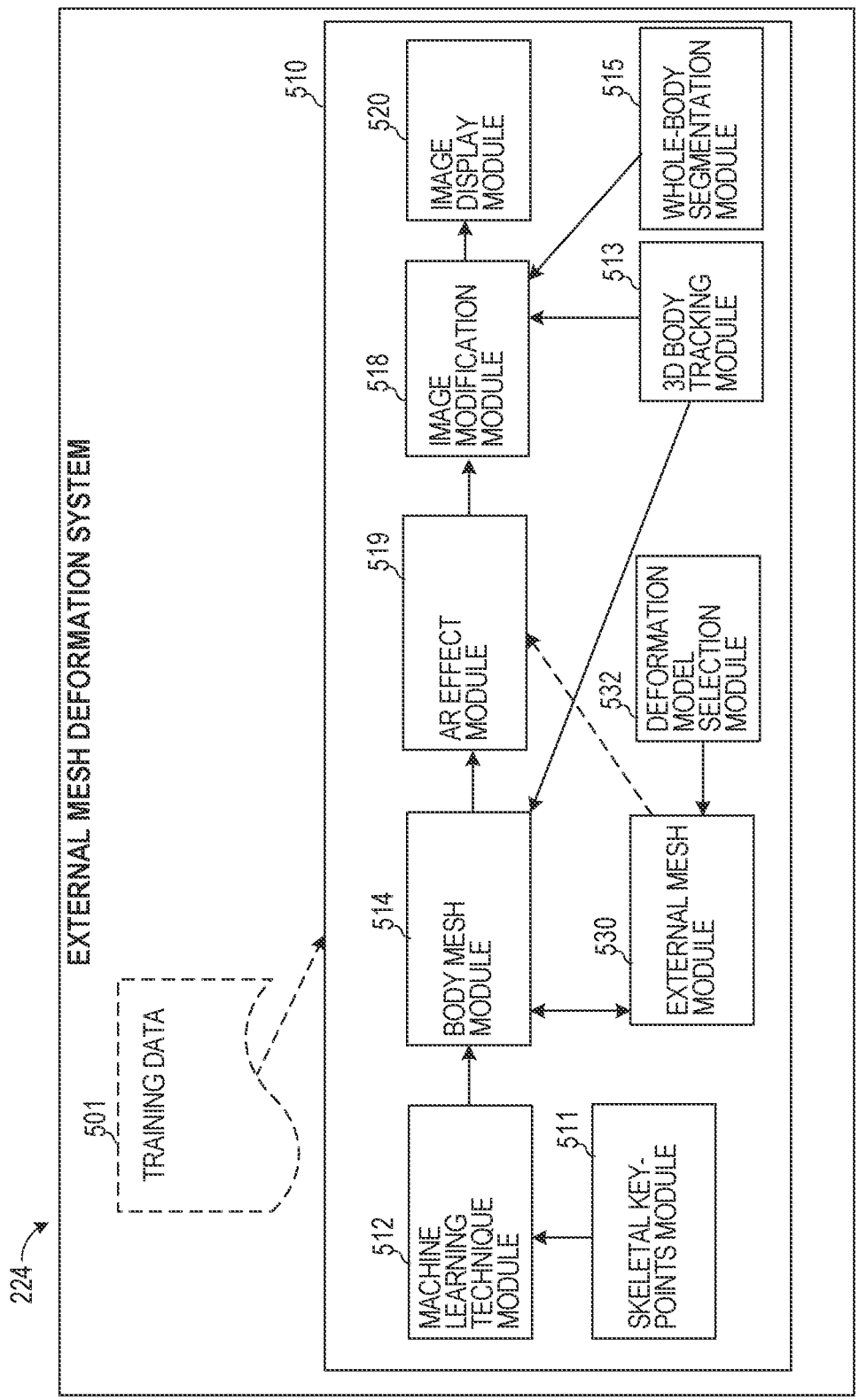
FIG. 5 is a block diagram showing an example external mesh deformation system, according to some examples.

FIG. 5 is a block diagram showing an example external mesh deformation system 224, according to example examples. External mesh deformation system 224 includes a set of components 510 that operate on a set of input data (e.g., a monocular image depicting a real-world object, such as a person or training data). The set of input data is obtained from one or more database(s) (FIG. 3) during the training phases and is obtained from an RGB camera of a client device 102 when an AR/VR application is being used, such as by a messaging client 104. External mesh deformation system 224 includes a machine learning technique module 512, a skeletal key-points module 511, a body mesh module 514, an image modification module 518, an AR effect module 519, an external mesh module 530, a deformation model selection module 532, a 3D body tracking module 513, a whole-body segmentation module 515, and an image display module 520.

During training, the external mesh deformation system 224 receives a given training image or video from training data 501. The external mesh deformation system 224 applies one or more machine learning techniques using the machine learning technique module 512 on the given training image or video. The machine learning technique module 512 extracts one or more features from the given training image or video to estimate a 3D body mesh of the person(s) or user(s) depicted in the image or video.

The machine learning technique module 512 retrieves 3D body mesh information associated with the given training image or video. The machine learning technique module 512 compares the estimated 3D body mesh with the ground truth garment 3D body mesh provided as part of the training data 502. Based on a difference threshold or deviation of the comparison, the machine learning technique module 512 updates one or more coefficients or parameters and obtains one or more additional training images or videos. After a specified number of epochs or batches of training images have been processed and/or when the difference threshold or deviation reaches a specified value, the machine learning technique module 512 completes training and the parameters and coefficients of the machine learning technique module 512 are stored in the trained machine learning technique(s) 307.

In some examples, during training, the machine learning technique module 512 receives 2D skeletal joint information from a skeletal key-points module 511. The skeletal key-points module 511 tracks skeletal key points of a user depicted in a given training image (e.g., head joint, shoulder joints, hip joints, leg joints, and so forth) and provides the 2D or 3D coordinates of the skeletal key points. This information is used by the machine learning technique module 512 to identify distinguishing attributes of the user depicted in the training image and to generate the 3D body mesh.

The 3D body mesh generated by the machine learning technique module 512 is provided to the body mesh module 514. The body mesh module 514 can track the object depicted in the image or video and update the 3D body mesh associated with the object. In an example, the body mesh module 514 can track the object based on 3D body tracking information provided by the 3D body tracking module 513. The body mesh module 514 can update the 3D body mesh in 3D and can adjust a position, body type, rotation, or any other parameter of the 3D body mesh.

Figure 6:
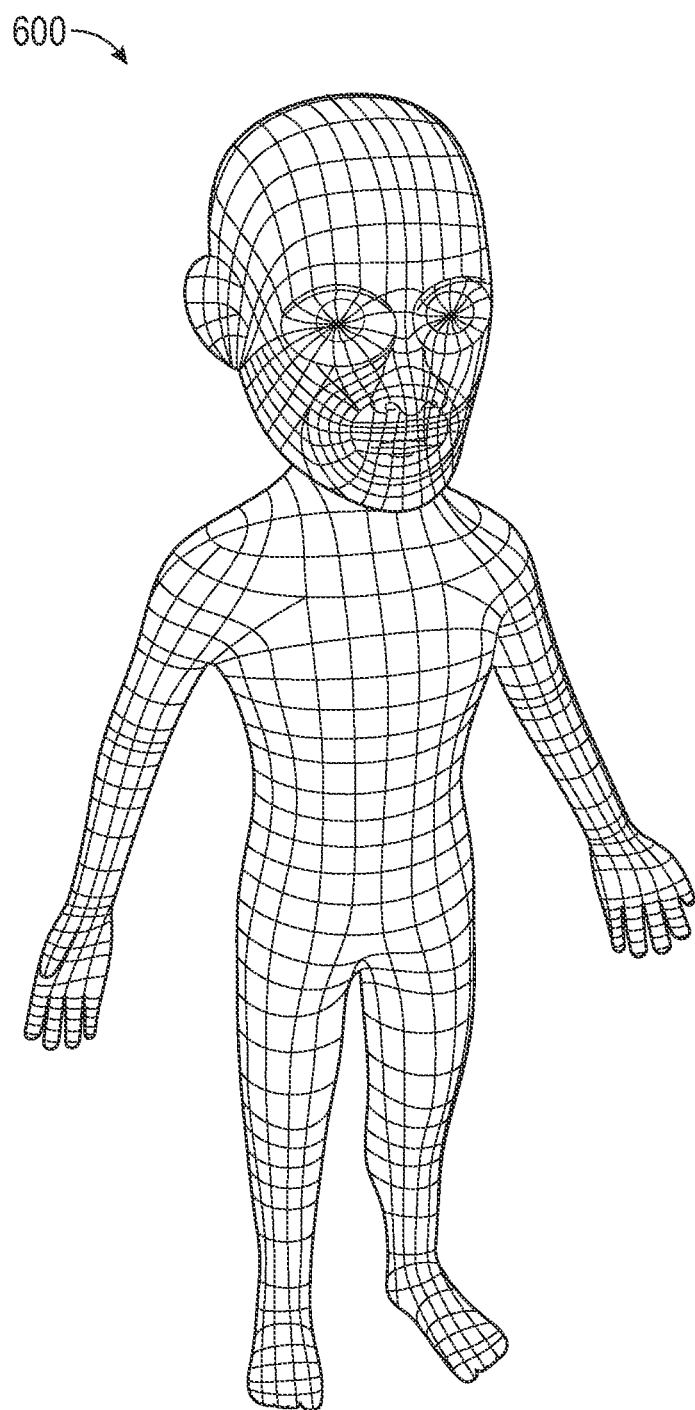
FIGS. 6, 7, and 8 are diagrammatic representations of outputs of the external mesh deformation system, in accordance with some examples.

FIG. 6 is a diagrammatic representation of outputs of the external mesh deformation system 224, in accordance with some examples. Specifically, FIG. 6 shows a 3D body mesh 600 generated and tracked by the body mesh module 514. In one example, the body mesh module 514 can track changes of the 3D body mesh across frames of the video. The body mesh module 514 can provide changes to the 3D body mesh to the external mesh module 530 to update and deform one or more portions of the external mesh that are associated with deformation attributes corresponding to a body movement deformation model. As an example, the one or more portions can be attached to or overlap the 3D body mesh and can be adjusted or deformed based on changes to the 3D body mesh.

The external mesh module 530 can identify different portions of the external mesh to deform based on respective deformation attributes. For example, a first deformation attribute can correspond to a garment location metric. The garment location metric can be used to associate a particular set of portions of the external mesh with a given deformation model based on the location of the particular set of portions relative to one or more landmarks of the 3D body mesh. Specifically, the garment location metric can identify a landmark on the 3D body mesh, such as a legs region, a torso region, or head region of the 3D body mesh. The garment location metric can also specify a minimum or maximum distance away from the identified landmark. The external mesh module 530 can determine a set of vertices of the external mesh that correspond to the garment location metric based on how the set of vertices are initially placed or aligned or correspond to the 3D body mesh.

In one example, the garment location metric can identify the legs region as the specified landmark of the 3D body mesh. In such cases, the external mesh module 530 can determine that a first set of vertices or a first portion of the external mesh overlaps the legs region of the 3D body mesh. In response, the external mesh module 530 can determine that the garment location metric for the first set of vertices or the first portion of the external mesh satisfies the garment location metric. The external mesh module 530 can then communicate with the deformation model selection module 532 to obtain and apply a first deformation model to the first set of vertices or the first portion of the external mesh. The deformation model selection module 532 can identify the first deformation model that is associated with satisfaction of the garment location metric. The deformation model selection module 532 can then apply the first deformation model (e.g., an external force model) to the first set of vertices or the first portion of the external mesh.

The external mesh module 530 can determine that a second set of vertices or a second portion of the external mesh is placed more than a threshold distance away from the specified landmark, such as the legs region of the 3D body mesh. In response, the external mesh module 530 can determine that the garment location metric for the second set of vertices or the second portion of the external mesh fails to satisfy the garment location metric. The external mesh module 530 can then communicate with the deformation model selection module 532 to obtain and apply a second deformation model to the second set of vertices or the second portion of the external mesh corresponding to a portion that fails to satisfy the garment location metric. The deformation model selection module 532 can identify the second deformation model that is associated with failure to satisfy the garment location metric. The deformation model selection module 532 can then apply the second deformation model (e.g., a body movement model) to the second set of vertices or the second portion of the external mesh.

The external mesh module 530 can determine that a third set of vertices or a third portion of the external mesh is placed more than a threshold distance away from another landmark, such as the torso region of the 3D body mesh. In response, the external mesh module 530 can determine that the garment location metric for the third set of vertices or the third portion of the external mesh satisfies the garment location metric. The external mesh module 530 can then communicate with the deformation model selection module 532 to obtain and apply a third deformation model to the third set of vertices or the third portion of the external mesh. The deformation model selection module 532 can identify the third deformation model that is associated with the garment location metric. The deformation model selection module 532 can then apply the third deformation model (e.g., a cloth simulation model) to the third set of vertices or the third portion of the external mesh.

The portions identified by the external mesh module 530 can change over time to be associated with different deformation models as the real-world object associated with the external mesh moves in a video. Namely, at a first point in time, the first portion of the external mesh can be determined to satisfy the first deformation attribute. In such cases, the first portion can be deformed based on the first deformation model. Later, at a second point in time, the real-world object can move or rotate resulting in movement of the external mesh. As a result, the first portion can now be determined to no longer satisfy the first deformation attribute and, in response, the first portion can, at the second point in time, be deformed based on the second deformation model instead of the first deformation model.

In some cases, the different deformation attributes can be ranked or weighted to control how much and what type of deformation to apply to the corresponding region of the external mesh. Namely, in some implementations, the deformation model selection module 532 can determine that the same set of vertices or the first portion of the external mesh is associated with and satisfies multiple deformation attributes. In such cases, the deformation model selection module 532 can determine a ranking of the deformation attributes and only apply one deformation model to the set of vertices or the first portion that is associated with a highest rank. In some implementations, the deformation model selection module 532 can obtain weights associated with the multiple deformation attributes that are satisfied or associated with the set of vertices or the first portion of the external mesh. The deformation model selection module 532 can then apply multiple deformation models to the set of vertices or the first portion of the external mesh in a blended manner, such that the amount of deformation applied by each deformation model corresponds to the weight associated with the corresponding deformation attribute. For example, the set of vertices or the first portion of the external mesh can be associated with first and second deformation attributes where the first deformation attribute is associated with a weight of 0.3 and the second deformation attribute is associated with a weight of 0.7. In such cases, the deformation model selection module 532 can apply a first deformation model associated with the first deformation attribute to the set of vertices or the first portion of the external mesh in a blended manner with a second deformation model associated with the second deformation attribute. Namely, the deformation model selection module 532 can deform the set of vertices or the first portion by an amount of 0.3 based on the first deformation model and by an amount of 0.7 based on the second deformation model.

As another example, a second deformation attribute can correspond to a garment looseness metric. The garment looseness metric can be used to associate a particular set of portions of the external mesh with a given deformation model based on how loose particular set of portions are. Specifically, the garment looseness metric can identify the looseness of a particular region or each region of the garment.

In one example, the garment looseness metric can identify a first set of vertices or a first portion of the external mesh that is associated with a first looseness. The external mesh module 530 can determine in response that the garment looseness metric is satisfied for the first portion of the external mesh based on the first looseness. The external mesh module 530 can then communicate with the deformation model selection module 532 to obtain and apply a first deformation model to the first portion of the external mesh. The deformation model selection module 532 can identify the first deformation model that is associated with satisfaction of the garment looseness metric. The deformation model selection module 532 can then apply the first deformation model (e.g., an external force model) to the first portion of the external mesh. Similarly, the external mesh module 530 can determine that a second portion of the external mesh is associated with a second looseness. In response, the external mesh module 530 can determine that the garment looseness metric is not satisfied for the second portion. The external mesh module 530 can then communicate with the deformation model selection module 532 to obtain and apply a second deformation model to the second portion of the external mesh corresponding to a portion that fails to satisfy the garment looseness metric. The deformation model selection module 532 can identify the second deformation model that is associated with failure to satisfy the garment looseness metric. The deformation model selection module 532 can then apply the second deformation model (e.g., a body movement model) to the second portion of the external mesh.

For example, a third deformation attribute can correspond to a body mesh density threshold. The garment location metric can be used to associate a particular set of portions of the external mesh with a given deformation model based on the body density of one or more landmarks of the 3D body mesh. The body density can be computed by obtaining a weight of the real-world object depicted in the image or video associated with the 3D body mesh and dividing the weight by a quantity of pixels in a given region. A greater density represents a smaller value resulting from diving the weight by the quantity of pixels in the given region whereas a smaller density represents a larger value resulting from diving the weight by the quantity of pixels in the given region. The external mesh module 530 can determine a set of vertices of the external mesh that correspond to the body mesh density threshold based on computing a density of the pixels in a first region based on the weight of the real-world object. The external mesh module 530 can identify a first portion that has a density that is lower than the body mesh density threshold (e.g., the first portion satisfies the body mesh density threshold) and a second portion that has a density that is greater than the body mesh density threshold (e.g., the second portion exceeds the body mesh density threshold).

The external mesh module 530 can then communicate with the deformation model selection module 532 to obtain and apply a first deformation model to the first portion of the external mesh and a second deformation model to the second portion. The deformation model selection module 532 can identify the first deformation model that is associated with satisfaction of the body mesh density threshold and can identify a second deformation model that is associated with exceeding the body mesh density threshold. The deformation model selection module 532 can then apply the first deformation model to the first portion of the external mesh and the second deformation model to the second portion of the external mesh.

For example, a fourth deformation attribute can correspond to a distance threshold. The distance threshold can be used to associate a particular set of portions of the external mesh with a given deformation model based on the distance of such portions relative to different portions of the 3D body mesh. In an example, the external mesh module 530 can identify a first portion of the external mesh that has a vertex that is more than a threshold distance away from an edge of the corresponding 3D body mesh. For example, the external mesh module 530 can select a vertex of the external mesh that corresponds to a legs portion of the 3D body mesh. The external mesh module 530 can compute a distance between the vertex or set of vertices of the external mesh that correspond to the legs portion and an edge or set of edges of the legs portion. The external mesh module 530 can compare the computed distance to the distance threshold to determine if the distance threshold is satisfied or fails to be satisfied. In such cases where the distance is more than the distance threshold, the external mesh module 530 can determine that the first portion fails to satisfy the distance threshold. The external mesh module 530 can then communicate with the deformation model selection module 532 to obtain and apply a first deformation model to the first portion of the external mesh.

As another example, a fifth deformation attribute can correspond to a user-labeled vertex attributes. The user-labeled vertex attributes can be used to associate a particular set of portions of the external mesh with a given deformation model based on labels a creator of the external mesh attached to the vertices of the external mesh. Specifically, the creator of the external mesh can attach or associate an identifier, such as a number or a color, to an attribute of a vertex or set of vertices of the external mesh. The external mesh module 530 can detect this identifier and use the identifier to select a particular deformation model to apply to the vertex or set of vertices.

In another example, the external mesh module 530 can identify a second portion of the external mesh that has a vertex that is less than a threshold distance away from an edge of the corresponding 3D body mesh. For example, the external mesh module 530 can select a vertex of the external mesh that corresponds to a torso portion of the 3D body mesh. The external mesh module 530 can compute a distance between the vertex or set of vertices of the external mesh that correspond to the torso portion and an edge or set of edges of the torso portion. The external mesh module 530 can compare the computed distance to the distance threshold to determine if the distance threshold is satisfied or fails to be satisfied. In such cases where the distance is less than the distance threshold, the external mesh module 530 can determine that the second portion satisfies the distance threshold. The external mesh module 530 can then communicate with the deformation model selection module 532 to obtain and apply a second deformation model to the second portion of the external mesh.

In one example, the deformation model that is applied to a given portion of the external mesh is a body movement model. In such cases, the external mesh module 530 can provide movement information of the 3D body mesh to the deformation model selection module 532. The deformation model selection module 532 can deform the identified portion of the external mesh (separately from the other portion(s)) based on the deformation or movement information of the 3D body mesh. For example, the external mesh module 530 can receive indication of a direction of movement or displacement, a rotation, or an adjustment to a shape, size, or position of the 3D body mesh and can then deform the identified portion of the external mesh based on the received indication in such cases where the identified portion is associated with a movement deformation model.

In an example, the body mesh module 514 can determine a first set of coordinates of the 3D body mesh in a normal-tangent space for a first frame of the frames of the video and can determine a second set of coordinates of the 3D body mesh in the normal-tangent space for a second frame of the frames of the video. The body mesh module 514 can compute, in real time, a change between the first and second sets of coordinates in the normal-tangent space and can transfer the change between the first and second sets of coordinates in the normal-tangent space to the external mesh. Specifically, the external mesh module 530 can update and adjust a 3D position and a 3D orientation of the external mesh portion that is associated with a body movement deformation model based on the change between the first and second sets of coordinates in the normal-tangent space. In this way, the external mesh module 530 can deform the portion(s) of the external mesh associated with an AR graphic without using a rig or bone information of the real-world object.

In an example, the external mesh module 530 can compute a rate at which the first set of coordinates changes to the second set of coordinates in the normal-tangent space (or any other suitable space). The external mesh module 530 can deform the other portion(s) of the external mesh based on an external force model representing the rate at which the first set of coordinates changes to the second set of coordinates in the normal-tangent space (or any other suitable space). For example, if the person depicted in the image or video turns or twists at a particular rate or speed, the body mesh module 514 can compute a first rate that represents the direction and the speed at which the person turns or twists. This first rate is provided to the external mesh module 530 which then changes or deforms the free hanging or dangling portion of the external mesh based on the first rate. In an example, the first rate can include a first value, in which case, the second portion of the external mesh is moved along a z-axis in an opposite direction from the direction at which the person turns or twists at the same speed as the person turns or twists.

The external mesh module 530 can receive an indication of an AR graphic from the AR effect module 519. The AR effect module 519 can receive a user input that selects a given AR graphic (e.g., an AR purse, AR necklace, AR cloth arm band, AR belt, and so forth) to add in real time to an underlying image or video. The external mesh module 530 can access a database and search the database for an external mesh associated with the given AR graphic. The external mesh module 530 can obtain placement information for the external mesh. The placement information can specify where to place the AR graphic in the image or video in relation to or relative to the real-world object and which portions of the AR graphic are deformed based on which type of deformation model (e.g., based on movement of the real-world object or based on external force simulation (e.g., wind, collision, physics, gravity, and so forth)).

In one example, the placement information can specify an edge or body part of the 3D body mesh corresponding to the real-world graphic (e.g., a left arm, a right arm, a head, and so forth) that is attached to or overlaps the first portion(s) of the external mesh. The placement information can also specify a minimum distance between the edge or body part away from which an edge of the corresponding AR graphic (first portion(s) of the external mesh) can be rendered for display. In response, the external mesh module 530 can maintain the position of the external mesh (and corresponding AR graphic) throughout a plurality of video frames at least the minimum distance away from the edge or body part of the body mesh. At the same time, a second portion of the external mesh is moved, displaced, and deformed based on outputs of the deformation model selection module 532.

In one example, the placement information can specify an edge or body part of the body mesh corresponding to the real-world graphic (e.g., a left arm, a right arm, a head, and so forth) that is attached to or overlaps the first portion(s) of the external mesh. The placement information can also specify a maximum distance between the edge or body part away from which an edge of the corresponding AR graphic (external mesh) can be rendered for display. In response, the external mesh module 530 can maintain the position of the external mesh (and corresponding AR graphic) throughout a plurality of video frames, at most the maximum distance away from the edge or body part of the body mesh. At the same time, a second portion of the external mesh is moved, displaced, and deformed based on outputs of the deformation model selection module 532.

In one example, the placement information can specify an edge or body part of the body mesh corresponding to the real-world graphic (e.g., a left arm, a right arm, a head, and so forth) that is attached to or overlaps the first portion(s) of the external mesh. The placement information can also specify a range of distances between the edge or body part away from which an edge of the corresponding AR graphic (external mesh) can be rendered for display. In response, the external mesh module 530 can maintain the position of the external mesh (and corresponding AR graphic) throughout a plurality of video frames between minimum and maximum values of the range of distances away from the edge or body part of the body mesh. At the same time, a second portion of the external mesh is moved, displaced, and deformed based on outputs of the deformation model selection module 532.

In one example, the placement information can specify relative UV channel coordinates of the 3D body mesh that is attached to or overlaps the first portion(s) of the external mesh. The relative UV channel coordinates can be used to maintain and place the external mesh (and corresponding AR graphic) within the image or video depicting an object. In this case, the external mesh module 530 can obtain UV channel coordinates of the 3D body mesh corresponding to the real-world object depicted in the image or video. The external mesh module 530 can also compute a set of UV channel coordinates of the first portion(s) of the external mesh based on the UV coordinates associated with the 3D body mesh and the relative UV channel coordinates in the placement information. For example, the placement information can specify a minimum or maximum distance away from a particular UV channel coordinate of the 3D body mesh at which the first portion(s) of the external mesh can be placed. In response, the external mesh module 530 can place the external mesh at a set of UV channel coordinates that are within the minimum or maximum distances from the UV coordinates of the 3D body mesh. As a result, the corresponding AR graphic associated with the external mesh is added to the image or video at the position that corresponds to the set of UV coordinates. At the same time, a second portion of the external mesh is moved, displaced, and deformed based on outputs of the deformation model selection module 532. Namely, the external mesh module 530 can identify a second portion(s) of the external mesh that is attached to the first portion(s) or adjacent to the first portion(s) of the external mesh and that is not attached to the 3D body mesh. This second portion(s) can be deformed and moved based on information received from the deformation model selection module 532.

The placement information can specify which vertices, pixels, UV coordinates, or locations of the external mesh are associated with, attached to, and/or overlap the 3D body mesh. The placement information can specify which vertices, pixels, UV coordinates, or locations of the external mesh dangle freely from the 3D body mesh. For these second portions, the placement information includes an instruction to deform the external mesh based on computations and deformations provided by the deformation model selection module 532. In one example, the placement information can include external force details that specify an external force function(s) to use to compute the corresponding deformation of the second portions. The external force function can include a physics simulation, a collision simulation, chain physics, a cloth simulation, and/or other suitable external force simulation functions.

Based on the placement information and changes detected for the 3D body mesh, the external mesh module 530 can deform the first portion(s) of the external mesh in correspondence to the changes detected in the 3D body mesh. In one example, the external mesh can be deformed to change the position in 3D relative to the 3D body mesh in response to detecting a change in 3D position of the 3D body mesh. For example, if the 3D body mesh is determined to move along a first axis by a first amount, the external mesh is similarly moved along the first axis by the first amount (or some other amount that is computed as a factor of the first amount). A second portion of the external mesh can be moved along a second axis based on external force simulation information received from the deformation model selection module 532. As another example, the external mesh can be rotated or twisted in a corresponding manner to the 3D body mesh. Specifically, if the 3D body mesh is determined to rotate along a rotational axis by a second amount, the external mesh is similarly rotated along the rotational axis by the second amount (or some other amount that is computed as a factor of the second amount).

As another example, the first portion(s) of the external mesh can be deformed based on changes to the body shape, body state, or body properties across frames of the image or video without deforming the second portion(s) of the external mesh. Specifically, if a portion of the 3D body mesh is reduced in size (e.g., a waist is indented by a specified amount as a result of an external force, such as a hand being placed on the waist), the corresponding portion of the external mesh is also reduced in size or repositioned in 3D space by the same amount or other specified amount. Namely, if the external mesh is associated with an AR purse strap that is overlaid on top of the person depicted in the image or video, the AR strap of the purse (the portion of the external mesh associated with the AR strap of the purse corresponding to the waist) is reduced in size or indented as a result of the 3D body mesh being reduced in size or being indented. In another example, the 3D body mesh can periodically expand and contract a chest portion of the 3D body mesh (or upper body portion) based on a breathing cycle of the person depicted in the image. In such cases, the corresponding portion of the external mesh that is placed over the chest or upper body portion of the 3D body mesh (but not any other portion of the external mesh) is deformed to expand and contract in size in correspondence with the breathing cycle.

In an example, the body mesh module 514 can compute changes in the Normal-Tangent space of the corresponding object. Namely, the body mesh module 514 can determine movement of the 3D body mesh in the Normal-Tangent space and can provide indications of that movement to the external mesh module 530. The external mesh module 530 can apply changes to the external mesh based on the movement in the Normal-Tangent space. In some cases, the external mesh module 530 can deform the first portion(s) of the external mesh to mirror the same movement in the Normal-Tangent space. In some cases, the external mesh module 530 can deform the first portion(s) of the external mesh as a factor of the movement in the Normal-Tangent space. At the same time, the external mesh module 530 can deform the second portion(s) of the external mesh based on a rate of the changes in the Normal-Tangent space of the corresponding object. Namely, the first portion(s) of the external mesh can be deformed to mirror the changes in the Normal-Tangent space of the 3D body mesh while the second portion(s) of the external mesh can be deformed as a function of a rate at which such changes occur.

The deformation model selection module 532 can implement a plurality of different deformation models, including one or more external force simulation models, and can combine their outputs to generate movement and deformation information for the respective portion(s) of the external mesh. For example, the deformation model selection module 532 can implement a gravity force simulation model that computes a new trajectory for a corresponding portion of the external mesh (e.g., a portion of the external mesh determined to have a deformation attribute associated with a gravity force simulation deformation model) based on motion information associated with a given object depicted in an image or video. The gravity force simulation model receives as input a current position of an object, past position of the object, movement vectors of the object, orientation of the object, a position of the second portion(s) of the external mesh when the object was at the past position, and a directional gravity function. The gravity force simulation model outputs a new set of coordinates and positions for the second portion(s) of the external mesh corresponding to the current position of the object based on application of the directional gravity function to the current position of an object, past position of the object, movement vectors of the object, orientation of the object, or a position of the second portion(s) of the external mesh when the object was at the past position. The new set of coordinates and positions of the second portion(s) of the external mesh are provided to the external mesh module 530, which then deforms the corresponding portion(s) based on the previous positions, the new set of coordinates and positions of the second portion(s) of the external mesh, and the relative position of the 3D body mesh.

As another example, the deformation model selection module 532 can implement a cloth simulation model that computes a new trajectory for a corresponding portion of the external mesh (e.g., a portion of the external mesh determined to have a deformation attribute associated with a cloth simulation deformation model) based on motion information associated with a given object depicted in an image or video and a cloth or material type associated with the AR element corresponding to the external mesh. The cloth simulation model receives as input a current position of an object, past position of the object, movement vectors of the object, orientation of the object, a position of the corresponding portion(s) of the external mesh when the object was at the past position, a material or cloth type associated with the corresponding portion(s) of the external mesh, and a cloth simulation function. The cloth simulation model outputs a new set of coordinates and positions for the corresponding portion(s) of the external mesh corresponding to the current position of the object based on application of the cloth simulation function to the current position of an object, past position of the object, movement vectors of the object, orientation of the object, cloth or material type of the corresponding portion(s), or a position of the second portion(s) of the external mesh when the object was at the past position. The new set of coordinates and positions of the corresponding portion(s) of the external mesh are provided to the external mesh module 530, which then deforms the corresponding portion(s) based on the previous positions, the new set of coordinates and positions of the second portion(s) of the external mesh, the cloth or material type, and the relative position of the 3D body mesh.

As another example, the deformation model selection module 532 can implement a chain physics simulation model that computes a new trajectory for a corresponding portion of the external mesh (e.g., a portion of the external mesh determined to have a deformation attribute associated with a chain physics simulation deformation model) based on motion information associated with a given object depicted in an image or video. The chain physics simulation model receives as input a current position of an object, past position of the object, movement vectors of the object, orientation of the object, a position of the corresponding portion(s) of the external mesh when the object was at the past position, and a chain physics function. The chain physics simulation model outputs a new set of coordinates and positions for the corresponding portion(s) of the external mesh corresponding to the current position of the object based on application of the chain physics function to the current position of an object, past position of the object, movement vectors of the object, orientation of the object, or a position of the second portion(s) of the external mesh when the object was at the past position. The new set of coordinates and positions of the corresponding portion(s) of the external mesh are provided to the external mesh module 530, which then deforms the corresponding portion(s) based on the previous positions, the new set of coordinates and positions of the second portion(s) of the external mesh, and the relative position of the 3D body mesh.

As another example, the deformation model selection module 532 can implement a collision simulation model that computes a new trajectory for a corresponding portion of the external mesh (e.g., a portion of the external mesh determined to have a deformation attribute associated with a collision simulation deformation model) based on motion information associated with a given object depicted in an image or video. The collision simulation model receives as input a current position of an object, past position of the object, movement vectors of the object, orientation of the object, a position of the corresponding portion(s) of the external mesh when the object was at the past position, and a collision function. The collision simulation model outputs an amount of expansion or contraction for the corresponding portion(s) of the external mesh corresponding to the current position of the object based on application of the collision function to the current position of an object, past position of the object, movement vectors of the object, orientation of the object, or a position of the corresponding portion(s) of the external mesh when the object was at the past position. For example, if the corresponding portion(s) of the external mesh is determined by the collision simulation model to collide or overlap with an edge of the object at a first rate, the amount of expansion or contraction is computed to be a first value. The first value can also be a factor of the material or type of the AR element represented by the external mesh and/or the material or type of the object. If the corresponding portion(s) of the external mesh is determined by the collision simulation model to collide or overlap with an edge of the object at a second rate (greater than the first rate), the amount of expansion or contraction is computed to be a second value that is greater than the first value. The amount of expansion or contraction of the corresponding portion(s) of the external mesh are provided to the external mesh module 530, which then deforms the corresponding portion(s) based on the previous positions, the new set of coordinates and positions of the corresponding portion(s) of the external mesh, and the relative position of the 3D body mesh and the amount of expansion or contraction. In this way, one portion of the external mesh can be expanded or contracted based on a collision simulation, while the other portion of the external mesh is only deformed based on movement of the 3D body mesh and may not necessarily be expanded or contracted.

In an example, the AR effect selection module 519 selects and applies one or more AR elements or graphics to an object depicted in the image or video based on the body mesh associated with the object received from the body mesh module 514. These AR graphics combined with the real-world object depicted in the image or video are provided to the image modification module 518 to render an image or video that depicts the person wearing the AR object, such as an AR purse or earrings.

The image modification module 518 can adjust the image captured by the camera based on the AR effect selected by the visual effect selection module 519. The image modification module 518 adjusts the way in which the AR garment(s) or fashion accessory placed over the user or person depicted in the image or video is/are presented in an image or video, such as by changing the physical properties (deformation) of the AR garment or fashion accessory based on the changes to the 3D body mesh of the user and an external force simulation and applying one or more AR elements (AR graphical elements). Image display module 520 combines the adjustments made by the image modification module 518 into the received monocular image or video depicting the user's body. The image or video is provided by the image display module 520 to the client device 102 and can then be sent to another user or stored for later access and display.

In some examples, the image modification module 518 and/or the external mesh module 530 receive 3D body tracking information representing the 3D positions of the user depicted in the image from the 3D body tracking module 513. The 3D body tracking module 513 generates the 3D body tracking information by processing the training data 501 using additional machine learning techniques. The image modification module 518 can also receive a whole-body segmentation representing which pixels in the image correspond to the whole body of the user from another machine learning technique. The whole-body segmentation can be received from the whole-body segmentation module 515. The whole-body segmentation module 515 generates the whole-body segmentation by processing the training data 501 using a machine learning technique.

Figure 7:
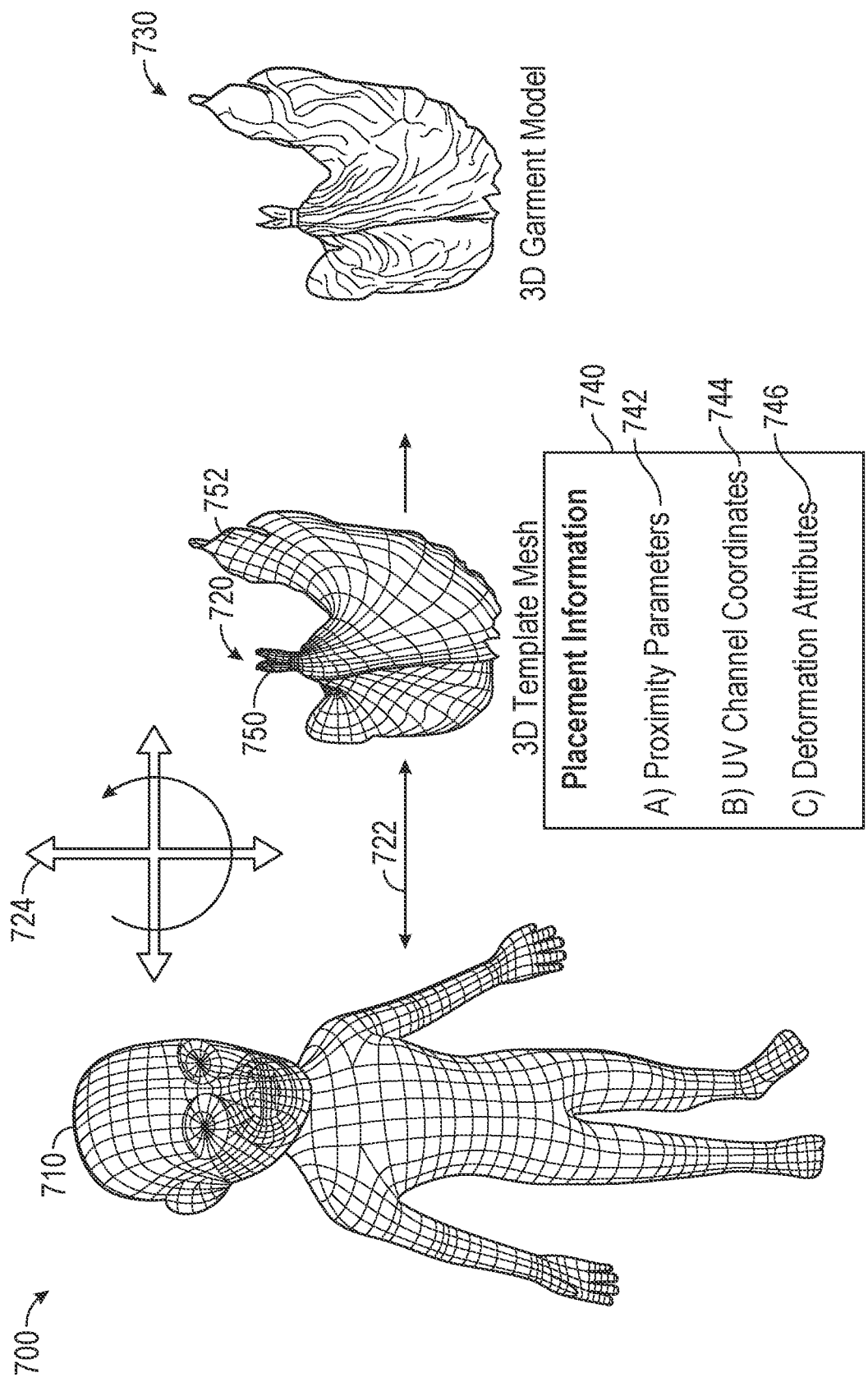

In one example, as shown in FIG. 7, the AR effect selection module 519 can apply one or more AR effects to an object depicted in an image or video 700 corresponding to a 3D body mesh 710 captured by a client device 102 using an external mesh 720. The external mesh 720 can include a first portion 750 that is associated with a first deformation attribute and a second portion 752 that is associated with a second deformation attribute. In an example, the first portion 750 can include a part of a dress that is fit tight around a torso of a person and the second portion 752 can include a bottom of the dress that fits loosely around the legs of the person.

The external mesh module 530 can receive the 3D body mesh 710 and can also obtain the external mesh 720, such as from a storage device, associated with an AR graphic 730 (e.g., an AR dress). The external mesh module 530 can obtain placement information 740 associated with the external mesh 720. The placement information 740 can specify proximity parameters 742, UV channel coordinates 744, and/or deformation attributes 746. Based on the placement information 740, the external mesh module 530 can specify where to place and position the external mesh 720 (and the corresponding AR graphic 730) in the image or video 700. Based on the placement information 740, the external mesh module 530 can identify different portions of the AR graphic 730 (e.g., the first portion 750 that satisfies one or more deformation attributes and a second portion 752 that satisfies one or more other deformation attributes) and instruct the deformation model selection module 532 to apply different deformation models to the different portions of the AR graphic 730.

In an example, the external mesh module 530 can compute a correspondence 722 between the first portion 750 of the external mesh 720 and the 3D body mesh 710. The correspondence 722 can be used to deform the first portion 750 of the external mesh 720 in 3D along one or more axes 724 based on how the 3D body mesh 710 is deformed (e.g., based on a movement model). As the external mesh module 530 deforms the first portion 750 of the external mesh 720, the corresponding AR graphic 730 is similarly deformed and rendered for display within the image or video based on the placement information 740. The external mesh module 530 can obtain deformation information for the second portion 752 and can deform the second portion 752 (independently of, separate from, and/or together with) the first portion 750 based on an external force deformation model.

In one example, to generate the placement information 740, an AR graphic designer can be provided on a client device 102 with a reference 3D body mesh. The AR graphic designer can drag and drop the external mesh (e.g., external mesh 720), on the reference 3D body mesh, that the graphic designer creates in association with an AR graphic. The AR graphic designer can input relative placement parameters, such as proximity parameters and UV channel coordinates, or the client device 102 can automatically compute the placement parameters based on how close and how far different edges or pixels of the external mesh are with respect to different edges, pixels, or body parts of the 3D body mesh. Using this information, the placement information 740 is generated and stored in association with the AR graphic. In some cases, the placement information 740 is automatically created and presented to the AR designer. The AR designer can specify a range, a minimum value, or maximum value for each edge or one or more edges or pixels or voxels of the external mesh. These ranges, minimum values, or maximum values are used by the external mesh module 530 to control placement and positioning of the external mesh (and corresponding AR graphic) within an image or video based on the 3D body mesh of an object depicted in the image or video.

The AR graphic designer can also be provided a graphical user interface for inputting the deformation attributes 746. The AR graphic designer can also specify UV coordinates, voxel positions, placement positions, and/or coordinates of the deformation attributes 746. The AR graphic designer can input custom deformation functions, such as external force functions and/or can select a subset of external force functions to apply.

Figure 8:
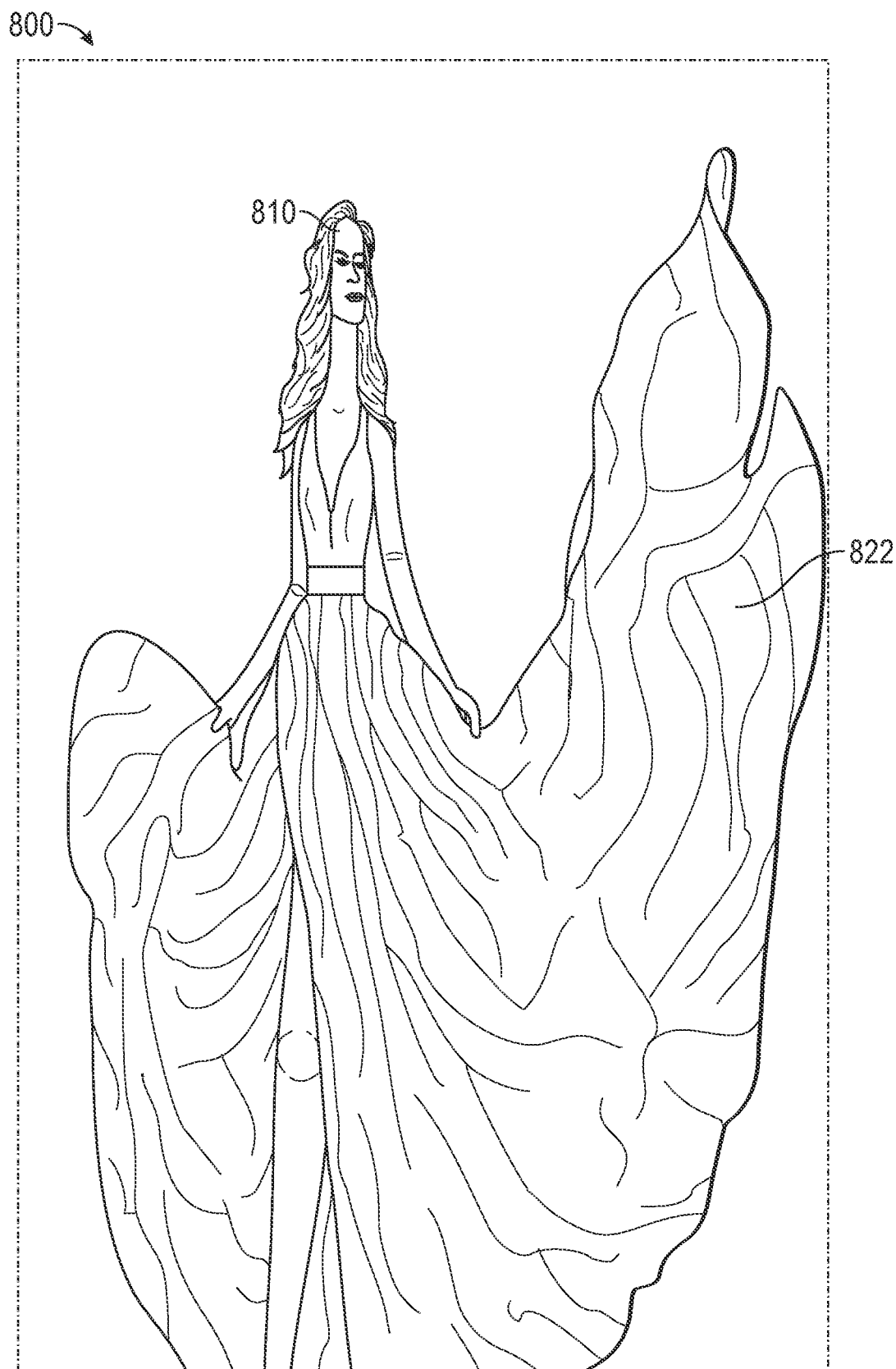

As shown in FIG. 8, after the external mesh is deformed based on deformation information and movement of the 3D body mesh 710, the corresponding AR graphic 730 is rendered for display on the image or video. Specifically, the image or video 800 includes a depiction of the user or person 810 and the AR graphic 730 (e.g., AR dress) that has been deformed based on movement of the 3D body mesh. The image or video 800 includes a depiction of the user or person 810 and deformed AR graphic 822 (e.g., AR dress) that has been deformed based on computations of the external force provided by the deformation model selection module 532.

Figure 9:
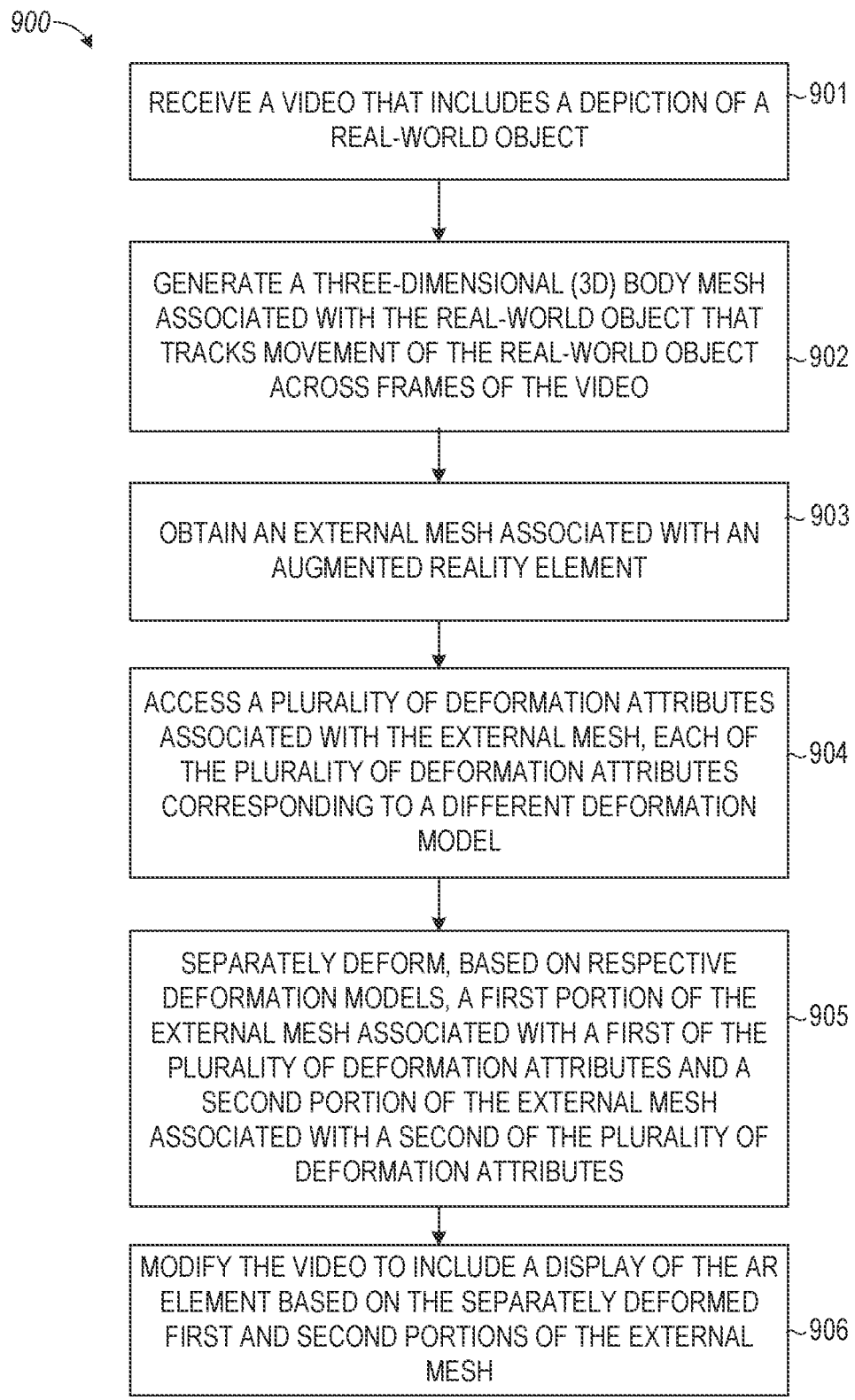
FIG. 9 is a flowchart illustrating example operations of the external mesh deformation system, according to some examples.

FIG. 9 is a flowchart of a process 900 performed by the external mesh deformation system 224, in accordance with some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 901, the external mesh deformation system 224 (e.g., a client device 102 or a server) receives a video that includes a depiction of a real-world object, as discussed above.

At operation 902, the external mesh deformation system 224 generates a 3D body mesh associated with the real-world object that tracks movement of the real-world object across frames of the video, as discussed above.

At operation 903, the external mesh deformation system 224 obtains an external mesh associated with an AR element, as discussed above.

At operation 904, the external mesh deformation system 224 accesses a plurality of deformation attributes associated with the external mesh, each of the plurality of deformation attributes corresponding to a different deformation model, as discussed above.

At operation 905, the external mesh deformation system 224 separately deforms, based on respective deformation models, a first portion of the external mesh associated with a first of the plurality of deformation attributes and a second portion of the external mesh associated with a second of the plurality of deformation attributes, as discussed above.

At operation 906, the external mesh deformation system 224 modifies the video to include a display of the AR element based on the separately deformed first and second portions of the external mesh, as discussed above.

Machine Architecture

Figure 10:
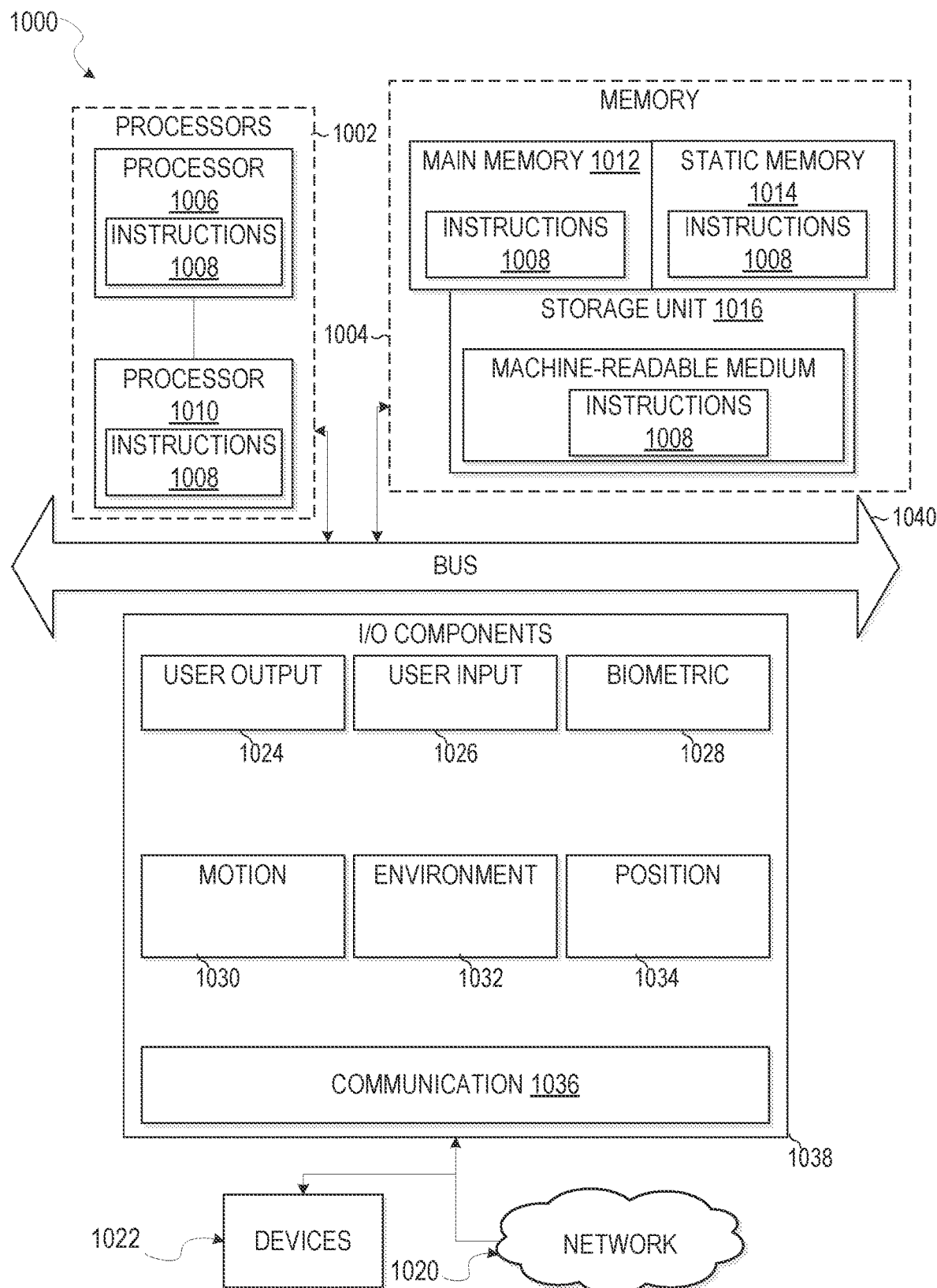
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of the machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1002, memory 1004, and input/output (I/O) components 1038, which may be configured to communicate with each other via a bus 1040. In an example, the processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single-core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, all accessible to the processors 1002 via the bus 1040. The main memory 1004, the static memory 1014, and the storage unit 1016 store the instructions 1008 embodying any one or more of the methodologies or functions described herein. The instructions 1008 may also reside, completely or partially, within the main memory 1012, within the static memory 1014, within machine-readable medium within the storage unit 1016, within at least one of the processors 1002 (e.g., within the processor's cache memory), or any suitable combination thereof, during execution thereof by the machine 1000.

The I/O components 1038 may include a wide variety of components to receive input, provide output, produce output, transmit information, exchange information, capture measurements, and so on. The specific I/O components 1038 that are included in a particular machine will depend on the type of machine. For example, portable machines such as mobile phones may include a touch input device or other such input mechanisms, while a headless server machine will likely not include such a touch input device. It will be appreciated that the I/O components 1038 may include many other components that are not shown in FIG. 10. In various examples, the I/O components 1038 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1038 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad, or penta rear camera configurations on the front and rear sides of the client device 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1038 further include communication components 1036 operable to couple the machine 1000 to a network 1020 or devices 1022 via respective coupling or connections. For example, the communication components 1036 may include a network interface component or another suitable device to interface with the network 1020. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1036) and using any one of several well-known transfer protocols (e.g., HTTP). Similarly, the instructions 1008 may be transmitted or received using a transmission medium via a coupling (e.g., a peer-to-peer coupling) to the devices 1022.

Software Architecture

Figure 11:
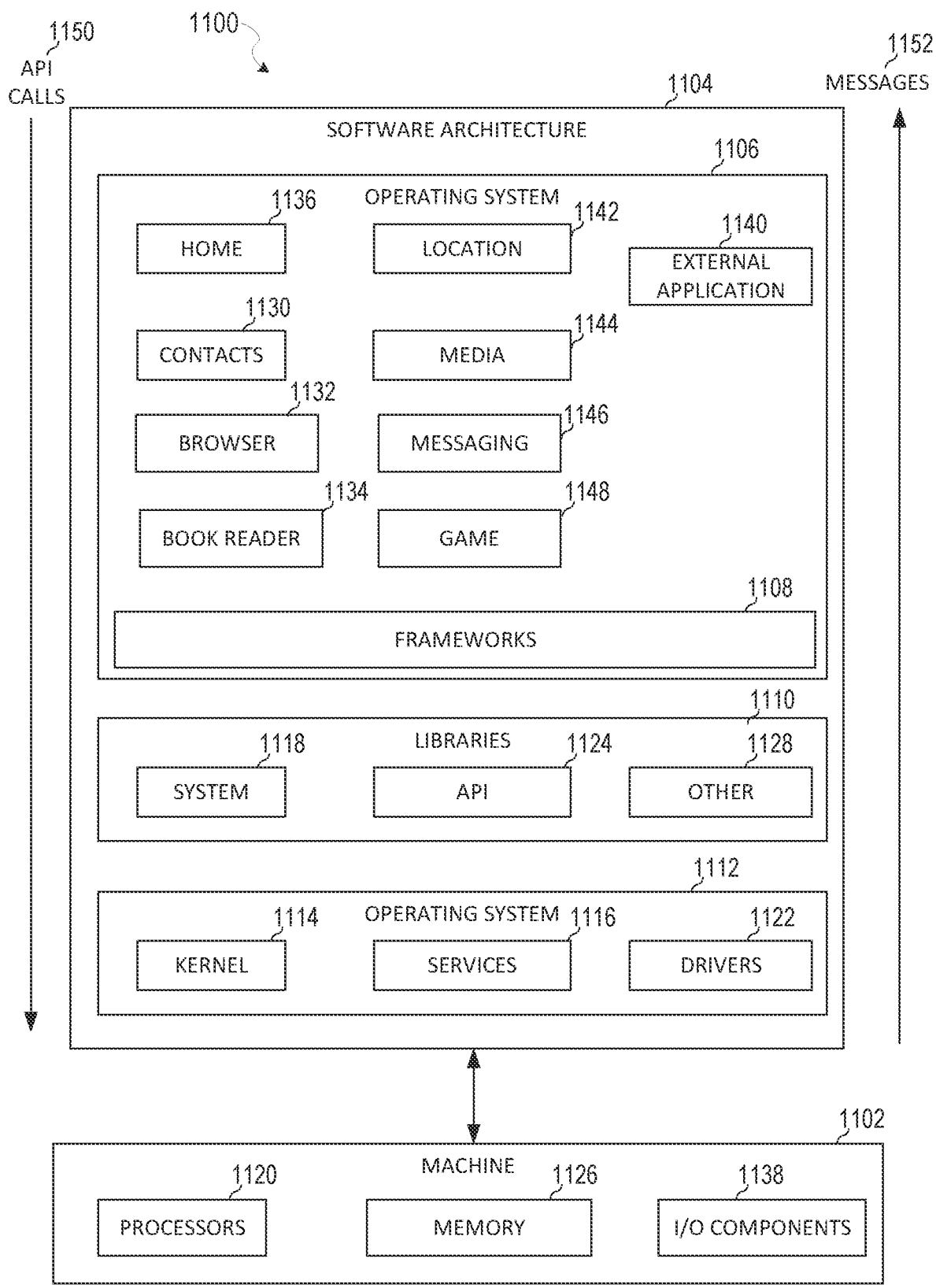
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as an external application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the external application 1140 (e.g., an application developed using the ANDROID™ or IOS™ SDK by an entity other than the vendor of the particular platform) may be mobile software running on a mobile operating system such as IOS™, ANDROID™, WINDOWS® Phone, or another mobile operating system. In this example, the external application 1140 can invoke the API calls 1150 provided by the operating system 1112 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, PDAs, smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1002 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium," and "device-readable medium" mean the same thing and may be used interchangeably in this disclosure.

"Ephemeral message" refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
generating, by one or more processors, a three-dimensional (3D) mesh associated with a real-world object that tracks movement of the real-world object;
obtaining an external mesh associated with an augmented reality (AR) element;
accessing a plurality of deformation attributes associated with the external mesh, each of the plurality of deformation attributes corresponding to a different deformation model;
separately deforming, based on respective deformation models, a first portion of the external mesh associated with a first of the plurality of deformation attributes and a second portion of the external mesh associated with a second of the plurality of deformation attributes; and modifying a video that includes a depiction of the real-world object to include a display of the AR element based on the first and second portions of the external mesh that have been separately deformed.

2. The method of claim 1, further comprising:

determining that the first portion of the external mesh is associated with the first of the plurality of deformation attributes; and determining that the second portion of the external mesh is associated with the second of the plurality of deformation attributes.

3. The method of claim 1, the 3D mesh comprising a 3D body mesh, further comprising:

automatically establishing a correspondence between the 3D body mesh associated with the real-world object and the external mesh, wherein the real-world object comprises a person; and wherein the 3D body mesh represents a whole body of the person depicted in the video.

4. The method of claim 3, wherein the first of the plurality of deformation attributes comprises a distance threshold, further comprising:

computing a distance between a vertex in the first portion of the external mesh and a first edge of the 3D body mesh corresponding to the first portion of the external mesh;

determining that the distance between the vertex in the first portion of the external mesh and the first edge of the 3D body mesh exceeds the distance threshold; and in response to determining that the distance between the vertex in the first portion of the external mesh and the first edge of the 3D body mesh exceeds the distance threshold, deforming the first portion of the external mesh based on a first of the respective deformation models.

5. The method of claim 4, further comprising:

computing a distance between a vertex in the second portion of the external mesh and a second edge of the 3D body mesh corresponding to the second portion of the external mesh;

determining that the distance between the vertex in the second portion of the external mesh and the second edge of the 3D body mesh is less than the distance threshold; and in response to determining that the distance between the vertex in the second portion of the external mesh and the second edge of the 3D body mesh is less than the distance threshold, deforming the second portion of the external mesh based on a second of the respective deformation models.

6. The method of claim 5, wherein the first of the respective deformation models comprises an external force model, and wherein the second of the respective deformation models comprises a movement model representing movement of the 3D body mesh.

7. The method of claim 6, wherein the external force model is defined by at least one of a physics simulation, a collision simulation, chain physics, or a cloth simulation.

8. The method of claim 3, wherein the first of the plurality of deformation attributes comprises a body mesh density threshold, further comprising:

computing a density of pixels within a first portion of the 3D body mesh corresponding to the first portion of the external mesh;

determining that the density of the pixels within the first portion of the 3D body mesh exceeds the body mesh density threshold; and in response to determining that the density of the pixels within the first portion of the 3D body mesh exceeds the body mesh density threshold, deforming the first portion of the external mesh based on a first of the respective deformation models.

9. The method of claim 8, further comprising:

computing a density of pixels within a second portion of the 3D body mesh corresponding to the second portion of the external mesh;

determining that the density of the pixels within the second portion of the 3D body mesh is less than the body mesh density threshold; and in response to determining that the density of the pixels within the second portion of the 3D body mesh is less than the body mesh density threshold, deforming the second portion of the external mesh based on a second of the respective deformation models.

10. The method of claim 9, wherein the first of the respective deformation models comprises a movement model representing movement of the 3D body mesh, and wherein the second of the respective deformation models comprises an external force model.

11. The method of claim 1, wherein the first of the plurality of deformation attributes corresponds to a garment looseness metric, wherein the first portion of the external mesh is deformed based on an external force model in response to determining that the first portion of the external mesh satisfies the garment looseness metric.

12. The method of claim 1, wherein the first of the plurality of deformation attributes corresponds to a garment location metric, wherein the first portion of the external mesh is deformed based on an external force model in response to determining that the first portion of the external mesh satisfies the garment location metric, wherein the second portion of the external mesh is deformed based on a body movement model in response to determining that the second portion of the external mesh fails to satisfy the garment location metric.

13. The method of claim 12, wherein the garment location metric is satisfied in response to determining that the first portion of the external mesh corresponds to a first portion of the 3D mesh, and wherein the second portion of the external mesh fails to satisfy the garment location metric in response to determining that the first portion of the external mesh corresponds to a second portion of the 3D mesh.

14. The method of claim 13, wherein the first portion of the 3D mesh comprises legs and wherein the second portion of the 3D mesh comprises a torso.

15. The method of claim 12, wherein the garment location metric represents a distance between a given portion of the external mesh relative to a torso portion of the 3D mesh.

16. The method of claim 1, wherein:

the first of the plurality of deformation attributes corresponds to at least one of a garment location metric, a garment looseness metric, a body mesh density threshold, or a distance threshold; and the second of the plurality of deformation attributes corresponds to at least a different one of the garment location metric, the garment looseness metric, the body mesh density threshold, or the distance threshold.

17. The method of claim 1, further comprising obtaining placement information for the external mesh that describes the plurality of deformation attributes indicating which portions of the external mesh are deformed based on movement of the real-world object and which portions of the external mesh are deformed or controlled based on an external force model.

18. The method of claim 1, further comprising:
    determining a first set of coordinates of the 3D mesh in a normal-tangent space for a first frame of the frames of the video;
    determining a second set of coordinates of the 3D mesh in the normal-tangent space for a second frame of the frames of the video;
    computing, in real time, a change between the first and second sets of coordinates in the normal-tangent space; and
    transferring the change between the first and second sets of coordinates in the normal-tangent space to the first portion or the second portion of the external mesh.

19. A system comprising:
    a processor of a client device; and
    a memory component having instructions stored thereon that, when executed by the processor, cause the processor to perform operations comprising:
    obtaining an external mesh associated with an augmented reality (AR) element;
    accessing a plurality of deformation attributes associated with the external mesh, each of the plurality of deformation attributes corresponding to a different deformation model;
    separately deforming, based on respective deformation models, a first portion of the external mesh associated with a first of the plurality of deformation attributes and a second portion of the external mesh associated with a second of the plurality of deformation attributes; and
    modifying a video that includes a depiction of a real-world object to include a display of the AR element based on the first and second portions of the external mesh that have been separately deformed.

20. A non-transitory computer-readable storage medium having stored thereon instructions that, when executed by a processor of a client device, cause the processor to perform operations comprising:
    obtaining an external mesh associated with an augmented reality (AR) element;
    accessing a plurality of deformation attributes associated with the external mesh, each of the plurality of deformation attributes corresponding to a different deformation model;
    separately deforming, based on respective deformation models, a first portion of the external mesh associated with a first of the plurality of deformation attributes and a second portion of the external mesh associated with a second of the plurality of deformation attributes; and
    modifying a video that includes a depiction of a real-world object to include a display of the AR element based on the first and second portions of the external mesh that have been separately deformed.

* * * * *